United States Patent
Hsu et al.

(10) Patent No.: US 12,330,588 B2
(45) Date of Patent: Jun. 17, 2025

(54) SYSTEM AND METHOD FOR GRANTING ACCESS TO AN AUTONOMOUS VEHICLE

(71) Applicant: TuSimple, Inc., San Diego, CA (US)

(72) Inventors: Yu-Ju Hsu, Tucson, AZ (US); Xiaoling Han, San Diego, CA (US)

(73) Assignee: TUSIMPLE, INC., San Diego, CA (US)

( * ) Notice: Subject to any disclaimer, the term of this patent is extended or adjusted under 35 U.S.C. 154(b) by 95 days.

(21) Appl. No.: 17/931,335

(22) Filed: Sep. 12, 2022

(65) Prior Publication Data

US 2023/0102898 A1 Mar. 30, 2023

Related U.S. Application Data

(60) Provisional application No. 63/261,625, filed on Sep. 24, 2021.

(51) Int. Cl.
*B60R 25/24* (2013.01)
*B60R 25/01* (2013.01)
(Continued)

(52) U.S. Cl.
CPC .............. *B60R 25/24* (2013.01); *B60R 25/01* (2013.01); *B60R 25/25* (2013.01);
(Continued)

(58) Field of Classification Search
CPC ..... B60R 25/24; B60R 25/25; B60R 25/1004; B60R 2325/20; B60W 60/0015; B60W 2300/145; G08G 1/096725; H04S 7/30
See application file for complete search history.

(56) References Cited

U.S. PATENT DOCUMENTS

| | | |
|---|---|---|
| 7,226,192 B2 | 6/2007 | Chen |
| 9,789,808 B1 | 10/2017 | Hong et al. |
| | (Continued) | |

FOREIGN PATENT DOCUMENTS

| | | |
|---|---|---|
| EP | 2292464 A1 | 3/2011 |
| EP | 3876143 A1 | 9/2021 |
| | (Continued) | |

OTHER PUBLICATIONS

International Search Report and Written Opinion corresponding to International Application No. PCT/US2022/076384 mailed Dec. 20, 2022.

(Continued)

*Primary Examiner* — Vernal U Brown
(74) *Attorney, Agent, or Firm* — Perkins Coie LLP

(57) ABSTRACT

A system for granting access to an autonomous vehicle comprises the autonomous vehicle, a control device, and a communication device associated with the autonomous vehicle. The communication device receives a signal from a device associated with a user that indicates the user requests the autonomous vehicle to pull over. The control device pulls the autonomous vehicle over to a side of road traveled by the autonomous vehicle. The control device receives a credential associated with the user. The control device determines whether the credential is verified. In response to determining that the credential is verified, the control device grants the user to access the autonomous vehicle.

20 Claims, 10 Drawing Sheets

(51) Int. Cl.
    *B60R 25/25*     (2013.01)
    *B60W 60/00*     (2020.01)
    *G08G 1/0965*     (2006.01)
    *G08G 1/0967*     (2006.01)

(52) U.S. Cl.
    CPC ....... *B60W 60/0015* (2020.02); *G08G 1/0965* (2013.01); *G08G 1/096725* (2013.01); *B60R 2325/20* (2013.01); *B60W 2300/145* (2013.01)

(56) References Cited

U.S. PATENT DOCUMENTS

| | | |
|---|---|---|
| 10,049,419 B1 | 8/2018 | Marron et al. |
| 11,516,613 B1 * | 11/2022 | Chebiyyam ............. G06F 18/24 |
| 2003/0107900 A1 | 6/2003 | Ellison |
| 2017/0120803 A1 | 5/2017 | Kentley et al. |
| 2019/0033856 A1 * | 1/2019 | Ferguson ........... G06Q 10/0837 |
| 2019/0084585 A1 | 3/2019 | Fritz et al. |
| 2019/0210560 A1 * | 7/2019 | Decia ....................... G07C 9/00 |
| 2022/0206500 A1 * | 6/2022 | Patnaik ................ G05D 1/0214 |
| 2022/0297716 A1 * | 9/2022 | Li ..................... B60W 60/0015 |
| 2022/0396292 A1 * | 12/2022 | Benmimoun ......... B60W 30/06 |

FOREIGN PATENT DOCUMENTS

| | | |
|---|---|---|
| EP | 3882076 A1 | 9/2021 |
| JP | 2012166652 A | 9/2012 |
| WO | 2005075247 A1 | 8/2005 |

OTHER PUBLICATIONS

Youtube video: Waymo vs Tesla FSD Beta; https://www.youtube.com/watch?v=sibfRCgMiFE.

Non-Final Office Action for U.S. Appl. No. 17/931,304, mailed on Aug. 1, 2024; 42 pages.

* cited by examiner

SYSTEM AND METHOD FOR GRANTING ACCESS TO AN AUTONOMOUS VEHICLE

RELATED APPLICATION AND CLAIM TO PRIORITY

This application claims priority to U.S. Provisional Application No. 63/261,625 filed Sep. 24, 2021 and titled "SYSTEM AND METHOD FOR GRANTING ACCESS TO AN AUTONOMOUS VEHICLE," which is incorporated herein by reference.

TECHNICAL FIELD

The present disclosure relates generally to autonomous vehicles. More particularly, the present disclosure is related to a system and method for granting access to an autonomous vehicle.

BACKGROUND

One aim of autonomous vehicle technologies is to provide vehicles that can safely navigate towards a destination. Autonomous vehicles are equipped with headlights, running lights, and taillights to illuminate the roadway. These lights also improve safety by providing visibility of the autonomous vehicle to drivers of other vehicles. Vehicles operating on a public roadway are subject to regulations, including a requirement that the vehicle pull over and stop in response to a signal by law enforcement.

SUMMARY

This disclosure recognizes various problems and previously unmet needs related to an autonomous vehicle communicating with the outside environment. Certain embodiments of this disclosure provide unique technical solutions to technical problems of current autonomous vehicle technologies, including those problems described above to: 1) implement adaptive light distributions for an autonomous vehicle; 2) communicate a driving mode of the autonomous vehicle; and 3) grant a user, such as a law enforcement officer, access to the autonomous vehicle.

Implementing Adaptive Light Distributions for Autonomous Vehicles

This disclosure contemplates systems and methods for implementing adaptive light distributions for autonomous vehicles as described below. In some cases, a control device of an autonomous vehicle may detect that a particular part of a road in front of the autonomous vehicle does not receive enough light from a headlight of the autonomous vehicle. The control device of the autonomous vehicle may detect that a particular part of the road does not receive enough light based on receiving an image from sensors of the autonomous vehicle and determining that a particular portion of the image has a light condition level less than a threshold light level. The light condition level may include light contrast, luminance, intensity, and/or brightness levels. In such cases, the control device of the autonomous vehicle adjusts the headlight of the autonomous vehicle to illuminate the particular part of the road that is shown in the particular portion of the image that has a light condition level less than the threshold light level.

In some cases, the control device may detect that the current illumination pattern emitted from the autonomous vehicle's headlight is directed toward oncoming traffic. In such cases, the control device diverts the current illumination pattern to another direction to avoid blinding drivers in the oncoming traffic until the oncoming traffic passes by the autonomous vehicle.

Accordingly, the disclosed system in this disclosure is integrated into a practical application of implementing adaptive light distributions for autonomous vehicles. This, in turn, provides additional practical applications of improving the autonomous vehicle's perception of the road ahead of the autonomous vehicle and improving the autonomous vehicle sensors' visibility. Thus, the autonomous vehicle can travel more safely, and cars surrounding an autonomous vehicle can also travel more safely.

According to one embodiment, a system comprises an autonomous vehicle and a control device. The autonomous vehicle is configured to travel along a road. The autonomous vehicle comprises at least one vehicle sensor located on the autonomous vehicle and a headlight mounted on the autonomous vehicle. The headlight is configured to illuminate at least a part of the road traveled by the autonomous vehicle. The control device is associated with the autonomous vehicle. The control device comprises a processor. The processor is configured to receive sensor data from the at least one vehicle sensor, where the sensor data comprises an image of one or more objects on the road. The processor may determine that a light condition level on a particular portion of the image is less than a threshold light level. The processor may adjust the headlight to increase illumination on a particular part of the road that is shown in the particular portion of the image.

Communicating a Driving Mode of an Autonomous Vehicle

This disclosure also contemplates systems and methods for communicating a driving mode of an autonomous vehicle to other vehicles in a predefined threshold region from the autonomous vehicle as described below.

In one embodiment, the control device of the autonomous vehicle may trigger a notification device to present a visual notification that indicates the autonomous vehicle is operating in the autonomous mode. The visual notification may include text, an image, a flashing light, a colored light, a symbol and/or the like.

In one embodiment, the control device of the autonomous vehicle may trigger a transceiver device to send a signal that indicates the autonomous vehicle is operating in the autonomous mode to other autonomous vehicles that are in a vehicle-to-vehicle (V2V) communication range from the autonomous vehicle.

Informing the vehicles on the same road as the autonomous vehicle that the autonomous vehicle is operating in an autonomous mode leads to a safer driving experience for the autonomous vehicle and the other vehicles. In response to receiving the indication that the autonomous vehicle is operating in the autonomous mode, the other vehicles may increase their distances from the autonomous vehicle to help the autonomous vehicle to navigate a safer route in traffic.

Accordingly, the disclosed system in this disclosure is integrated into a practical application of enabling communication between the autonomous vehicle and other vehicles by using the notification device and/or the transceiver device.

This, in turn, provides an additional practical application of improving navigation plans for the autonomous vehicle, especially in traffic, and providing a safer driving experience for the autonomous vehicle and other vehicles.

According to one embodiment, a system comprises an autonomous vehicle and a control device. The autonomous vehicle is configured to travel along a road. The autonomous vehicle comprises at least one vehicle sensor located on the autonomous vehicle and a notification device located on the autonomous vehicle. The control device is associated with the autonomous vehicle. The control device comprises a processor. The processor is configured to operate the autonomous vehicle in an autonomous mode. The processor defines a threshold region around the autonomous vehicle. The processor receives sensor data from the at least one vehicle sensor. The processor detects the presence of at least one vehicle from the sensor data. The processor determines a distance between the autonomous vehicle and the at least one vehicle. The processor determines that at least one vehicle is within the threshold region based on determining that the distance is within the threshold region. While the autonomous vehicle is operating in the autonomous mode, the processor triggers the notification device to notify the at least one vehicle that the autonomous vehicle is operating in the autonomous mode, where notifying that the autonomous vehicle is operating in the autonomous mode comprises presenting a visual notification.

Granting a User Access to the Autonomous Vehicle

This disclosure contemplates systems and methods for granting a user access to the autonomous vehicle as described below. The user may be a law enforcement officer, for example. In such an example scenario, assume that a law enforcement officer flags the autonomous vehicle to pull over. The control device of the autonomous vehicle may detect sirens and/or flashing lights of the law enforcement officer's vehicle. The law enforcement officer may also use an electronic device to send a signal to pull over the autonomous vehicle to a communication device plugged into (or communicatively coupled to the autonomous vehicle), such as a mobile phone, a laptop, or a tablet computer. In response, the control device pulls over the autonomous vehicle. In some cases, the law enforcement officer may request to access the autonomous vehicle and retrieve data associated with the autonomous vehicle, such as health data or checkup status, tire pressures, etc. The control device may grant the law enforcement officer access to the autonomous vehicle in response to validating a credential associated with the law enforcement officer, such as an identification card, a quick response (QR) code, biometric features (e.g., fingerprint), etc.

Accordingly, the disclosed system in this disclosure is integrated into a practical application of enabling communication between the autonomous vehicle and the electronic device associated with a user.

According to one embodiment, a system comprises an autonomous vehicle and a control device. The autonomous vehicle is configured to travel along a road. The control device is associated with the autonomous vehicle. The control device comprises a communication device and a processor. The communication device is configured to receive, from a device associated with a user, a signal comprising a request for the autonomous vehicle to come to a safe stop. The processor is operably coupled with the communication device. The processor may cause the autonomous vehicle to perform a safe stop maneuver in response to receiving the signal. The processor receives a credential associated with the user. The processor determines whether the credential associated with the user is verified. The processor grants the user access to the autonomous vehicle in response to determining that the credential associated with the user is valid.

To summarize, the disclosed systems provide several practical applications and technical advantages which include: 1) technology that improves the autonomous vehicle's perception of the road ahead of the autonomous vehicle and autonomous vehicle's sensors visibility by implementing adaptive light distributions to adjust the illumination patterns emitted from the autonomous vehicle's headlight to focus the illumination on a particular part of the road shown in particular portion of an image that has a light condition level less than a threshold light level; 2) technology that enables communication between the autonomous vehicle and other vehicles by using the notification device; 3) technology that enables communication between the autonomous vehicle and other autonomous vehicles in the V2V communication range from the autonomous vehicle using the transceiver device; 4) technology that enables communication between the autonomous vehicle and the electronic device associated with a user who is attempting to access the autonomous vehicle; and 5) technology that grants the user access to the autonomous vehicle upon verifying the credential associated with the user.

As such, the systems described in this disclosure may be integrated into practical applications of enabling communication between the autonomous vehicle and other vehicles and devices, and determining a more efficient, safe, and reliable navigation solution for autonomous vehicles as well as other vehicles on the same road as the autonomous vehicle.

Furthermore, the systems described in this disclosure may be integrated into an additional practical application of improving information security and data loss prevention technologies. For example, by verifying the credentials of the user who is requesting to gain access to the autonomous vehicle, data stored in the control device of the autonomous vehicle is kept secure from unauthorized access, and thus from data extraction, manipulation, destruction, and exfiltration.

This, in turn, provides an additional practical application of improving the underlying operations of the control device. For example, by protecting the data stored in the control device, the processing and memory resources of the autonomous vehicles can be utilized more efficiently, and the autonomous vehicles can be navigated with more precision.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

In some cases, while an autonomous vehicle is traveling along a road, the autonomous vehicle may detect that a part of the road does not receive enough light from a headlight of the autonomous vehicle. This may lead to unsafe driving conditions for the autonomous vehicle. In some cases, while an autonomous vehicle is traveling along a road, the autonomous vehicle may be flagged to pull over by a law enforcement officer. The law enforcement officer may pull over the autonomous vehicle for a routine system checkup, but not have suitable access to the autonomous vehicle.

As described above, previous technologies fail to provide efficient, reliable, and safe solutions for facilitating communication between an autonomous vehicle and the outside environment. This disclosure provides various systems, methods, and devices to 1) implement adaptive light distributions for an autonomous vehicle; 2) communicate a driving mode of an autonomous vehicle to other vehicles; 3) grant a user access to an autonomous vehicle upon verifying user's credentials; 4) enabling communication between an autonomous vehicle and other vehicles and devices; and 5) providing a safe driving experience for autonomous vehicles, other vehicles, and pedestrians.

Figure 1:
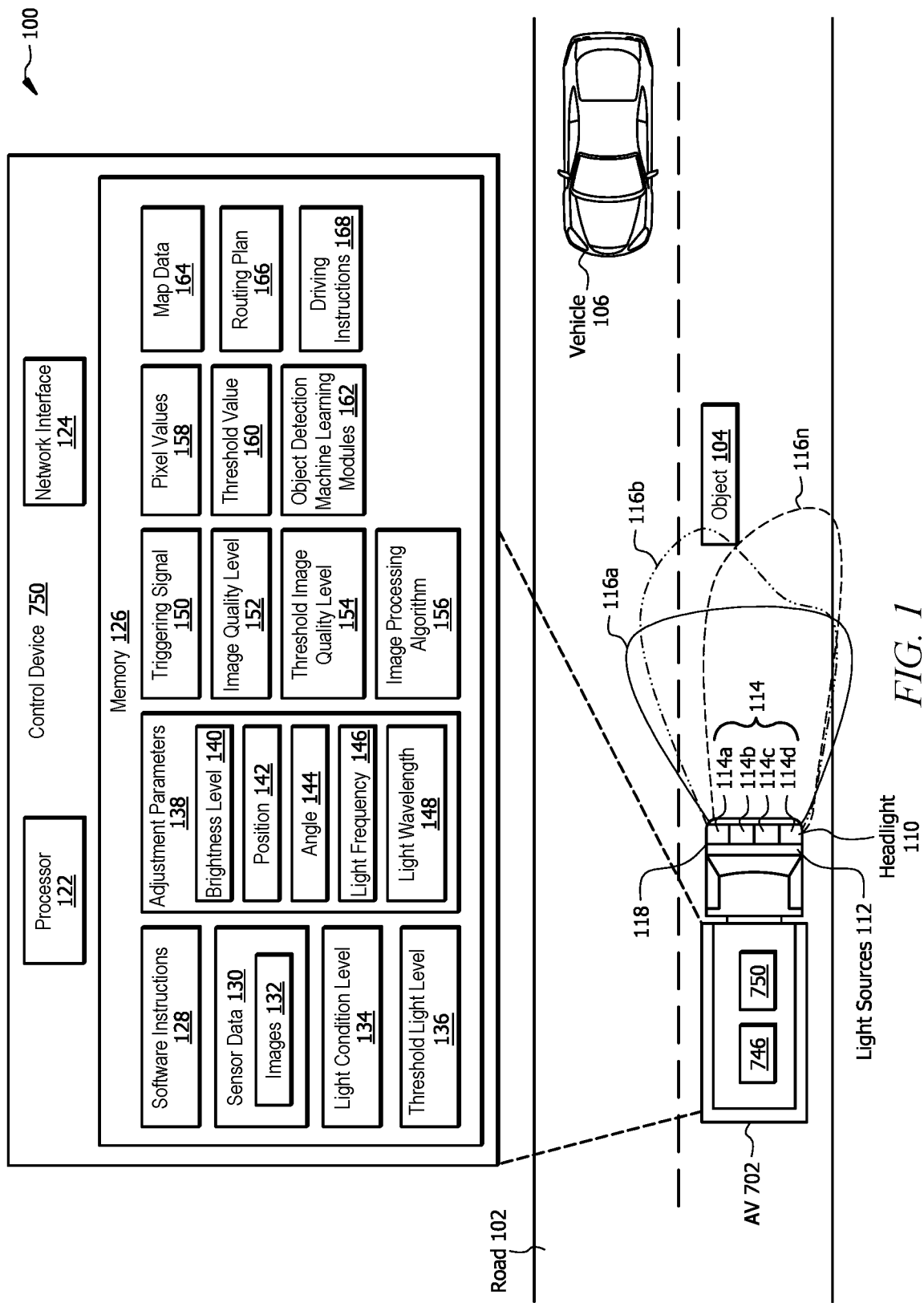
FIG. 1 illustrates an embodiment of a system configured to implement adaptive light distributions for an autonomous vehicle.
Figure 2:
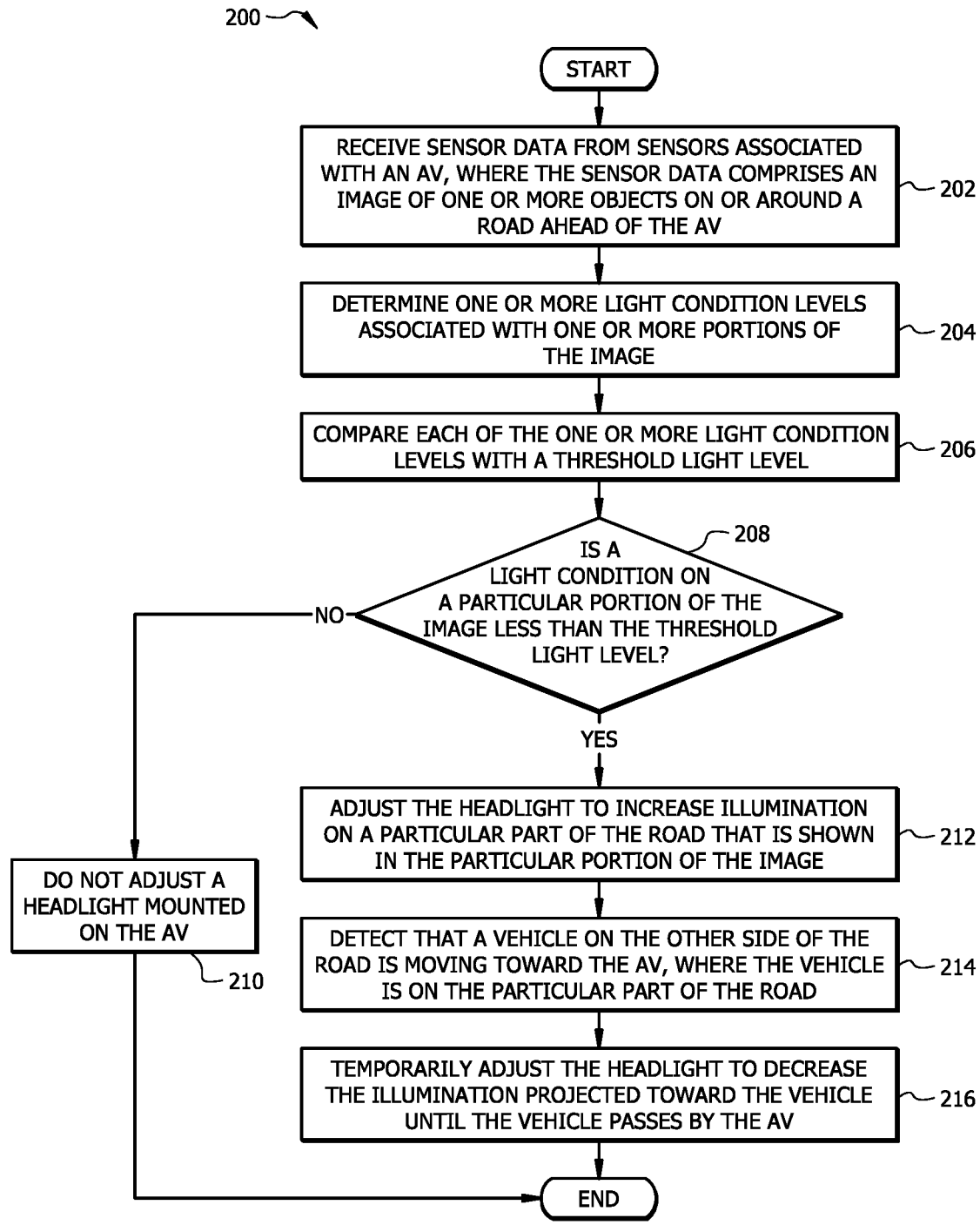
FIG. 2 illustrates an example flowchart of a method for implementing adaptive light distributions for an autonomous vehicle.
Figure 3A:
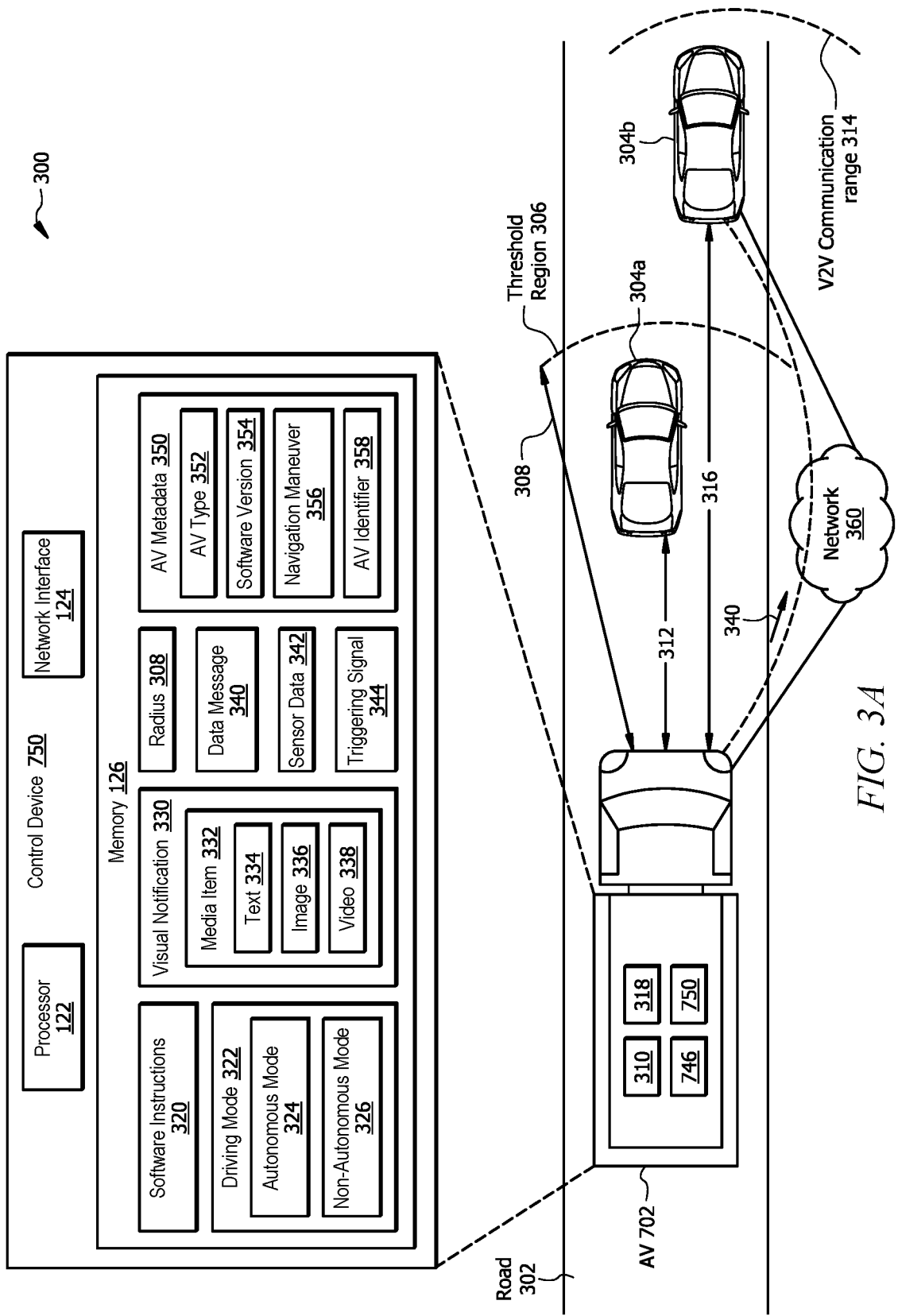
FIGS. 3A and 3B illustrate an embodiment of a system configured to communicate a driving mode of an autonomous vehicle.
Figure 3B:
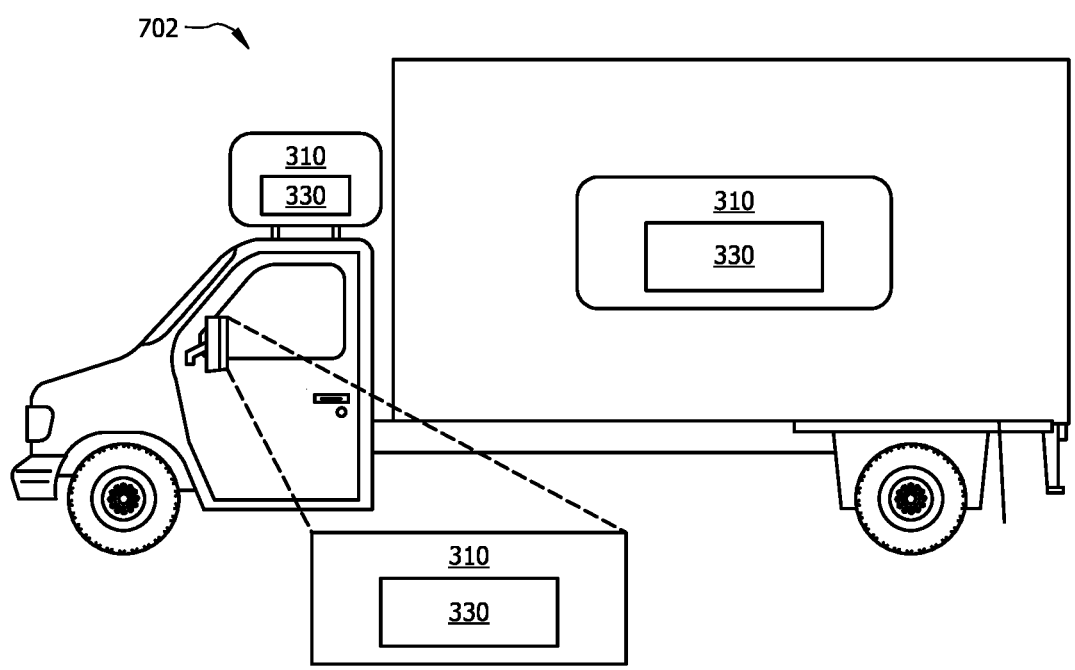
Figure 4:
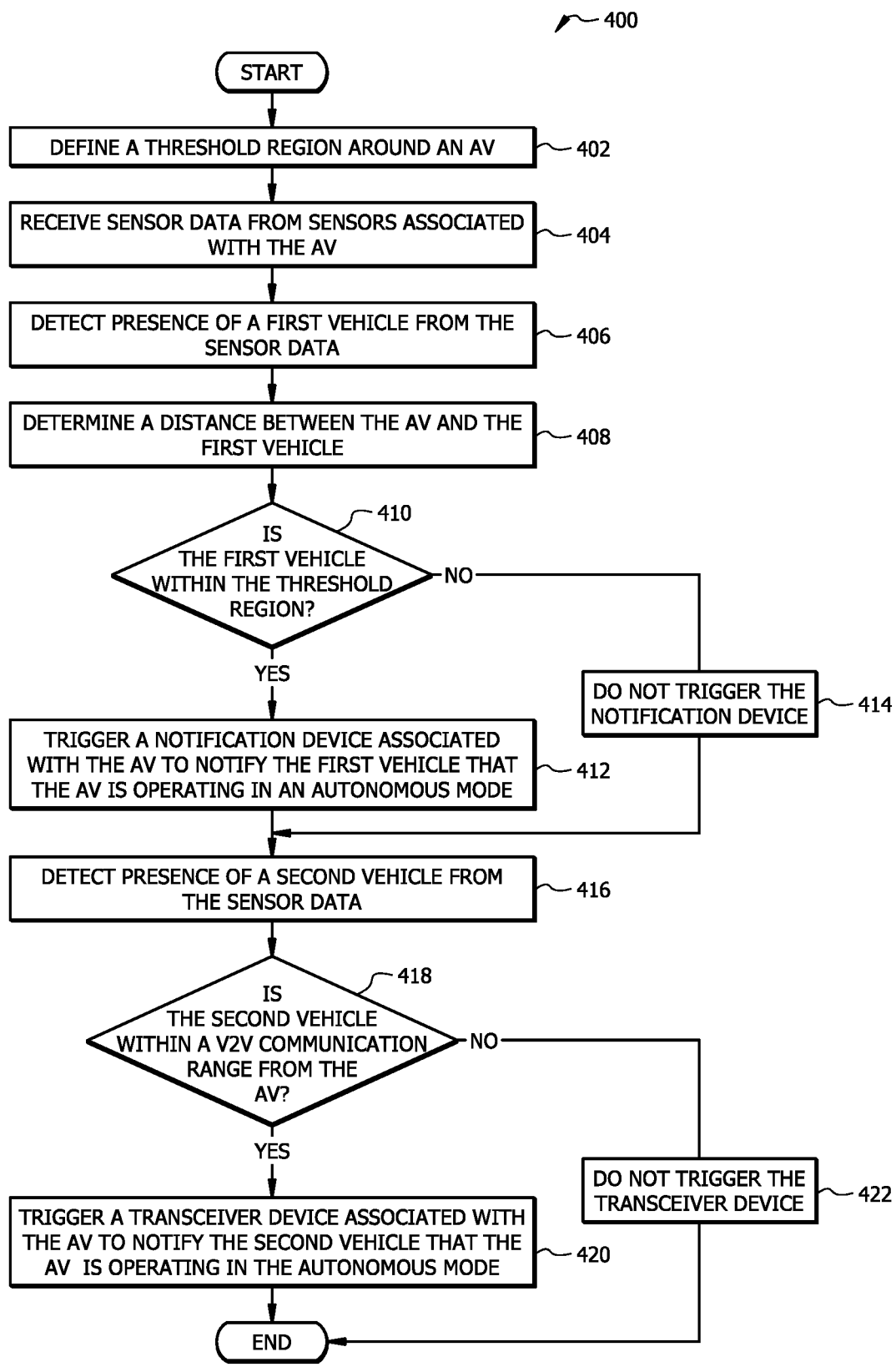
FIG. 4 illustrates an example flowchart of a method for communicating a driving mode of an autonomous vehicle.
Figure 5:
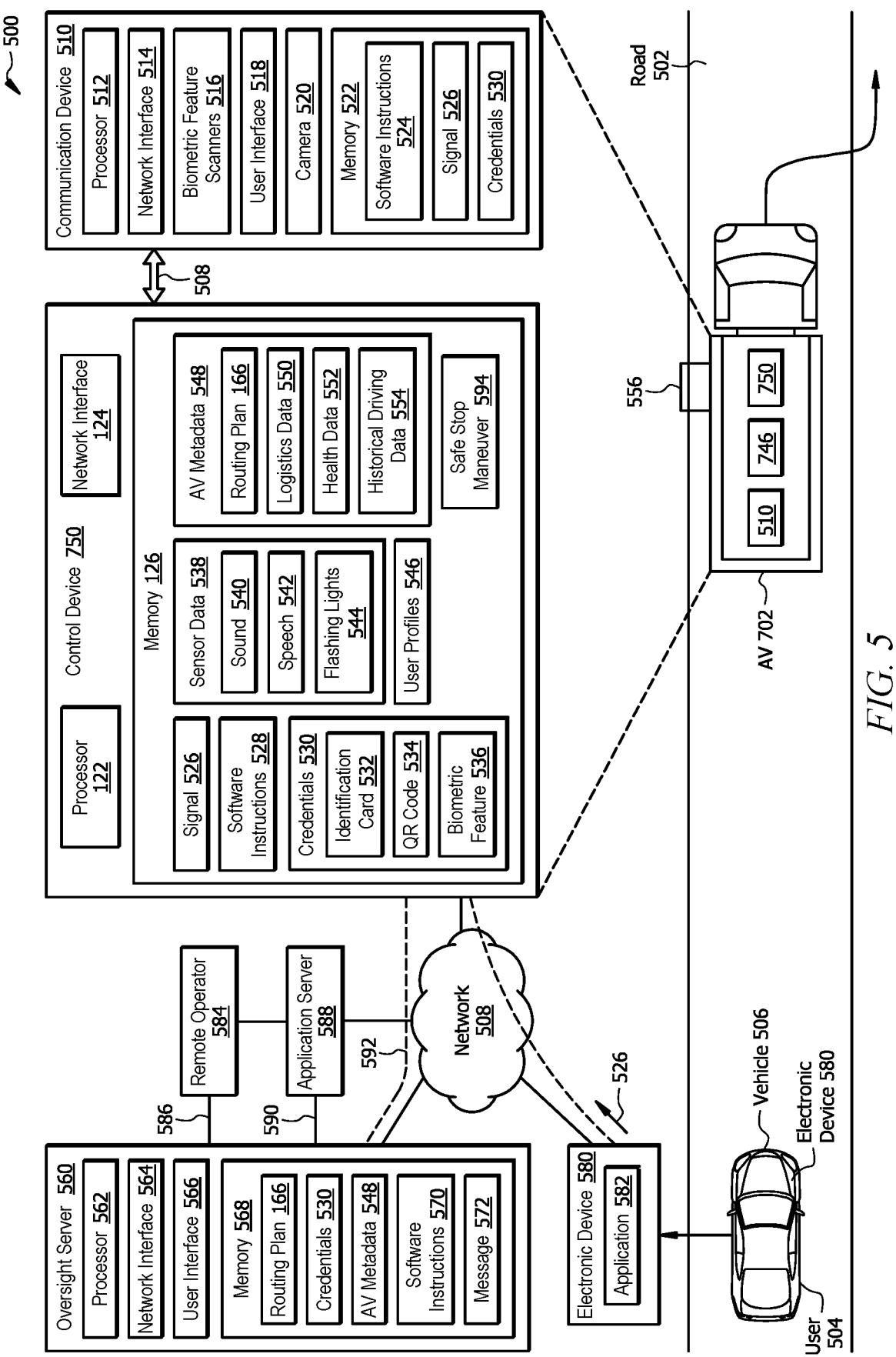
FIG. 5 illustrates an embodiment of a system configured to grant a user access to an autonomous vehicle.
Figure 6:
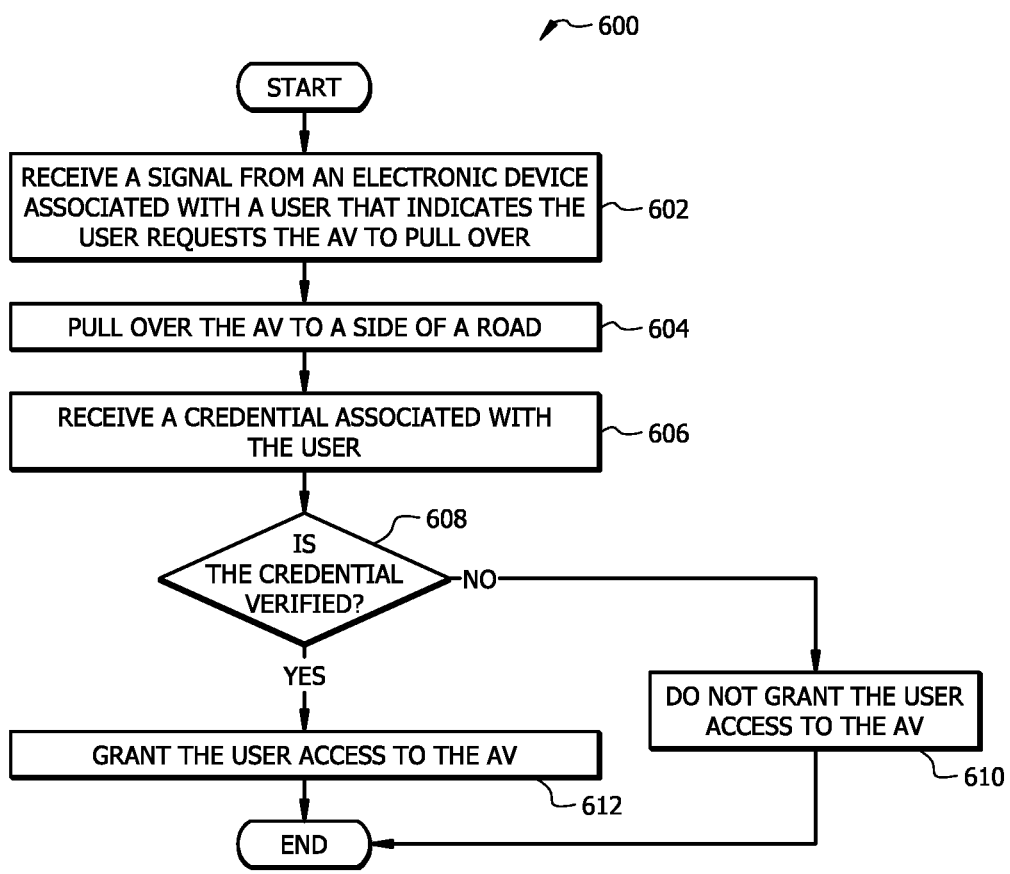
FIG. 6 illustrates an example flowchart of a method for granting a user access to an autonomous vehicle.

FIG. 1 illustrates an embodiment of a system 100 for implementing adaptive light distributions for an autonomous vehicle. FIG. 2 illustrates an embodiment of a method 200 for implementing adaptive light distributions for an autonomous vehicle. FIGS. 3A and 3B illustrate an embodiment of a system 300 for communicating a driving mode of an autonomous vehicle to other vehicles. FIG. 4 illustrates an embodiment of a method 400 for communicating a driving mode of an autonomous vehicle to other vehicles. FIG. 5 illustrates an embodiment of a system 500 for granting a user access to an autonomous vehicle. FIG. 6 illustrates an embodiment of a method 600 for granting a user access to an autonomous vehicle. FIGS. 7-10 illustrate an example autonomous vehicle and its various systems and devices for implementing autonomous driving operations by the autonomous vehicle.

Example System for Implementing an Adaptive Light Distribution for Autonomous Vehicles FIG. 1 illustrates an embodiment of a system 100 for implementing an adaptive light distribution for autonomous vehicles 702. FIG. 1 further illustrates a simplified schematic diagram of a road 102 traveled by an autonomous vehicle 702. In one embodiment, system 100 comprises an autonomous vehicle 702 and its components, such as a control device 750, sensors 764, and a headlight 110. The control device 750 comprises a processor 122 in signal communication with a memory 126. The memory 126 stores software instructions 128 that when executed by the processor 122, cause the processor 122 to execute one or more functions described herein. For example, when the software instructions 128 are executed, the processor 122 may trigger the headlight 110 to project a light distribution pattern 116.

In general, the system 100 may be configured to use the headlight 110 to adjust a light distribution pattern 116 projected toward one or more parts of the road 102 that is determined to have light condition levels 134 below a threshold light level 136 (e.g., do not receive enough light). In this manner, system 100 improves the perception of the autonomous vehicle 702 with respect to road 102 and the visibility of the sensors 746.

In some cases, while adjusting the illumination pattern 116 emitted by the headlight 110, oncoming traffic might be detected in front of the autonomous vehicle 702. In such cases, system 100 may be configured to divert the emitted light distribution 116 from the oncoming traffic by adjusting the light distribution pattern 116 toward other parts of the road 102 in front of the autonomous vehicle 702. In this manner, system 100 can avoid blinding drivers in the oncoming traffic. This process is described further below in conjunction with the operational flow of the system 100. The system 100 may be configured as shown or in any other suitable configuration.

System Components

Figure 7:
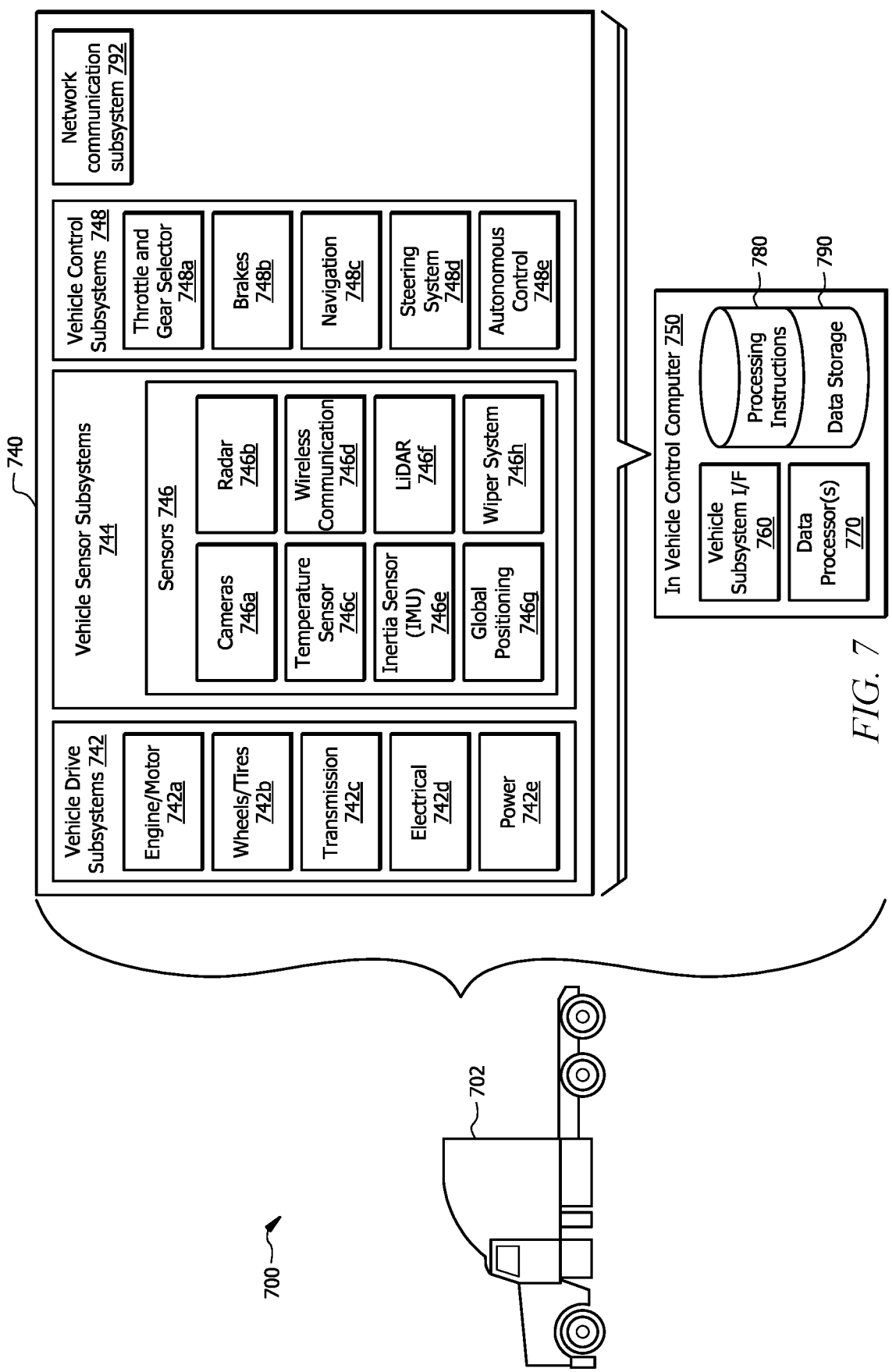
FIG. 7 illustrates a block diagram of an example autonomous vehicle configured to implement autonomous driving operations.

In one embodiment, the autonomous vehicle 702 may include a semi-truck tractor unit attached to a trailer to transport cargo or freight from one location to another location (see FIG. 7). The autonomous vehicle 702 is generally configured to travel along a road 102 in an autonomous mode. The autonomous vehicle 702 may navigate using a plurality of components described in detail in FIGS. 7-10. The operation of the autonomous vehicle 702 is described in greater detail in FIGS. 7-10. The corresponding description below includes brief descriptions of certain components of the autonomous vehicle 702.

Control device 750 may be generally configured to control the operation of the autonomous vehicle 702 and its components, and to facilitate autonomous driving of the autonomous vehicle 702. The control device 750 may be further configured to determine a pathway in front of the autonomous vehicle 702 that is safe to travel and free of objects or obstacles, and navigate the autonomous vehicle 702 to travel in that pathway. This process is described in more detail in FIGS. 7-10. The control device 750 may generally include one or more computing devices in signal communication with other components of the autonomous vehicle 702 (see FIG. 7).

The control device 750 may be configured to detect objects on and around road 102 by analyzing the sensor data 130 and/or map data 164. For example, the control device 750 may detect objects on and around road 102 by implementing object detection machine learning modules 162. The object detection machine learning module 162 may be implemented using neural networks and/or machine learning algorithms for detecting objects from images, videos, infrared images, point clouds, radar data, etc. The object detection machine learning module 162 is described in more detail further below. The control device 750 receives sensor data 130 from the sensors 746 positioned on the autonomous vehicle 702 to determine a safe pathway to travel. The sensor data 130 may include data captured by the sensors 746.

Sensors 746 are configured to capture any object within their detection zones or fields of view, such as landmarks, lane markings, lane boundaries, road boundaries, vehicles, pedestrians, road/traffic signs, among others. The sensors 746 may include cameras, LiDAR sensors, motion sensors, infrared sensors, and the like. In one embodiment, the sensors 746 may be positioned around the autonomous vehicle 702 to capture the environment surrounding the autonomous vehicle 702. See the corresponding description of FIG. 7 for further description of the sensors 746.

Example Headlight

Headlight 110 comprises a light-emitting apparatus and may be generally configured to emit various light distribution patterns 116, such as light distribution patterns 116a, 116b, and 116n. The headlight 110 may be communicatively coupled with the control device 750, for example, by wireless communication protocols, such as WiFi, Bluetooth, etc., or by wires.

The headlight 110 may be controlled by the control device 750 to adjust the light distribution pattern 116 emitted from the headlight 110. In a default scenario, the headlight 110 may project a default illumination pattern 116a. In the default illumination pattern 116a, for example, the headlight 110 is distributing the light evenly. In other scenarios, the headlight 110 may project other light distribution patterns 116 to focus the light distribution on one or more parts of the road 102 as described further below in conjunction with the operational flow of the system 100.

In some embodiments, the control device 750 may control the headlight 110 by adjusting or changing one or more adjustment parameters 138, including brightness level 140, position 142, angle 144, light frequency 146, light wavelength 148, among others. The process of controlling the headlight 110 using each of the adjustment parameters 138 is described further below in conjunction with the operational flow of system 100. The corresponding description below described various embodiments of the headlight 110.

In a particular embodiment, the headlight 110 may comprise a first headlight 110 located on a left side in front of the autonomous vehicle 702 and a second headlight 110 located on a right side in front of the autonomous vehicle 702.

In the same or another embodiment, the headlight 110 may comprise a one-dimensional strip of light sources 112 that is extended from a left side of a cab of the autonomous vehicle 702 to the right side of the cab of the autonomous vehicle 702.

In the same or another embodiment, the headlight 110 may comprise a two-dimensional matrix of light sources 112 extended from the left side of the cab of the autonomous vehicle 702 to the left side of the cab of the autonomous vehicle 702.

In some embodiments, the light sources 112 may include one or more of an optical light source 112 (e.g., a visible light source 112), an infrared light source 112 (e.g., an invisible light source 112), a near-infrared light source 112, and any other light source 112 with wavelengths within the light spectrum. For example, the light sources 112 may include light emitting diodes (LEDs), light bulbs, among other light sources.

In one embodiment, the headlight 110 may comprise a plurality of sections 114, such as 114a to 114d. Each section 114 may be individually controllable in terms of one or more of the adjustment parameters 138. Each section 114 may include one or more light sources 112. In one embodiment, adjusting the headlight 110 and light distribution patterns 116 may include changing a brightness level 140 associated with one or more sections 114 of the headlight 110.

In one embodiment, the headlight 110 may be coupled to a motor driver device 118 that is configured to change an angle 144 of one or more sections 114 of the headlight 110. Thus, adjusting the headlight 110 and light distribution patterns 116 may include changing an angle 144 of one or more sections 114 of the headlight 110. For example, changing the angle 144 of the at least one section 114 of the headlight 110 may include physically rotating or changing the angle 144 of the at least one section 114 of the headlight 110 from left to right (or right to left); or up to down (or down to up); or any combination thereof.

The motor driver device 118 may include a processor module (e.g., a microprocessor) communicatively coupled with a memory that stores data and instructions used by the processor to perform its functions. The motor driver device 118 may be communicatively coupled with the control device 750, for example, by wireless communication protocols, such as WiFi, Bluetooth, etc. or by wires. The motor driver device 118 may comprise an actuator that converts control signals from the control device 750 into mechanical motions to adjust the headlight 110.

In one embodiment, the headlight 110 may be mounted on a rail, and the motor driver device 118 may be configured to move one or more sections 114 of the headlight 110. Thus, adjusting the headlight 110 and light distribution patterns 116 may include changing a position 142 of one or more sections 114 of the headlight 110. For example, changing the position 142 of one or more sections 114 of the headlight 110 may include physically moving the one or more sections 114 of the headlight 110 from one side of the cab of the autonomous vehicle 702 to another, such as from left to right (or right to left); or up to down (or down to up); or any combination thereof.

In one embodiment, the headlight 110 may comprise a phased array light source 112 that is configured to facilitate light beam steering. For example, the control device 750 may adjust the headlight 110 to steer the light beam emitted from the phased array light source 112 to one or more particular directions. The phased array light source 112 may be omnidirectional or multi-directional.

In one embodiment, the headlight 110 may include light sources 112 that are associated with various light frequencies 146, such as any frequency range from 300 GHz to 650 terahertz (THz). For example, the headlight 110 may include a first set of light sources 112 that is configured to operate in a first frequency range 146 (e.g., 400 THz to 425 THz), a second set of set of light sources 112 that is configured to operate in a second frequency range 146 (e.g., 425 THz to 450 THz), and so on. Thus, adjusting the headlight 110 and light distribution patterns 116 may include adjusting frequencies 146 associated with one or more light sources 112.

In one embodiment, the headlight 110 may include light sources 112 that are associated with various light wavelengths 148, such as any wavelength range from 450 nm to 1 mm. For example, the headlight 110 may include a first set of light sources 112 that is configured to operate in a first wavelength range 148 (e.g., 700 nm to 750 nm), a second set of light source 112 that is configured to operate in a second wavelength range 148 (e.g., 650 nm to 700 nm), and so on. Thus, adjusting the headlight 110 and light distribution patterns 116 may include adjusting light wavelengths 148 associated with one or more light sources 112.

Control Device

The control device 750 is described in detail in FIG. 7. In brief, the control device 750 may include a processor 122 in signal communication with a memory 126 and a network interface 124. The processor 122 may include one or more processing units that perform various functions as described herein. The memory 126 stores any data and/or instructions used by the processor 122 to perform its functions. For example, the memory 126 stores software instructions 128 that when executed by the processor 122 causes the control device 750 to perform one or more functions described herein.

The processor 122 may be one of the data processors 770 described in FIG. 7. The processor 122 comprises one or more processors operably coupled to the memory 126. The processor 122 may include electronic circuitry, including state machines, one or more central processing unit (CPU) chips, logic units, cores (e.g., a multi-core processor), field-programmable gate array (FPGAs), application-specific integrated circuits (ASICs), or digital signal processors (DSPs). The processor 122 may be a programmable logic device, a microcontroller, a microprocessor, or any suitable combination of the preceding. The processor 122 may be communicatively coupled to and in signal communication with the network interface 124 and memory 126. The one or more processors are configured to process data and may be implemented in hardware or software. For example, the processor 122 may be 8-bit, 16-bit, 32-bit, 64-bit or of any other suitable architecture. The processor 122 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute software instructions 128 to implement the functions disclosed herein, such as some or all of those described with respect to FIGS. 1-9. In some embodiments, the function described herein may be implemented using logic units, FPGAs, ASICs, DSPs, or any other suitable hardware or electronic circuitry.

The network interface 124 may be a component of the network communication subsystem 792 described in FIG. 7. The network interface 124 may be configured to enable wired and/or wireless communications. The network interface 124 may be configured to communicate data between the control device 750 and other network devices, systems, or domain(s). For example, the network interface 124 may comprise a WIFI interface, a local area network (LAN) interface, a wide area network (WAN) interface, a modem, a switch, or a router. The processor 122 may be configured to send and receive data using the network interface 124. The network interface 124 may be configured to use any suitable type of communication protocol.

The memory 126 may be one of the data storages 790 described in FIG. 7. The memory 126 stores any of the information described in FIGS. 1-9 along with any other data, instructions, logic, rules, or code operable to implement the function(s) described herein when executed by processor 122. For example, the memory 126 may store software instructions 128, sensor data 130, light condition level 134, threshold light level 136, triggering signal 150, image quality level 152, threshold image quality level 154, image processing algorithm 156, pixel values 158, threshold value 160, adjustment parameters 138, object detection machine learning module 162, map data 164, routing plan 166, driving instructions 168, and/or any other data/instructions. The software instructions 128 include code that when executed by the processor 122 causes the control device 750 to perform the functions described herein, such as some or all of those described in FIGS. 1-9. The memory 126 comprises one or more disks, tape drives, or solid-state drives, and may be used as an over-flow data storage device, to store programs when such programs are selected for execution, and to store instructions and data that are read during program execution. The memory 126 may be volatile or non-volatile and may comprise read-only memory (ROM), random-access memory (RAM), ternary content-addressable memory (TCAM), dynamic random-access memory (DRAM), and static random-access memory (SRAM). The memory 126 may include one or more of a local database, cloud database, network-attached storage (NAS), etc.

Object detection machine learning modules 162 may be implemented by the processor 122 executing software instructions 128, and may be generally configured to detect objects and obstacles from the sensor data 130. The object detection machine learning modules 162 may be implemented using neural networks and/or machine learning algorithms for detecting objects from any data type, such as images, videos, infrared images, point clouds, radar data, etc.

In one embodiment, the object detection machine learning modules 162 may be implemented using machine learning algorithms, such as support vector machine (SVM), Naive Bayes, Logistic Regression, k-Nearest Neighbors, Decision Trees, or the like. In one embodiment, the object detection machine learning modules 162 may utilize a plurality of neural network layers, convolutional neural network layers, and/or the like, in which weights and biases of these layers are optimized in the training process of the object detection machine learning modules 162. The object detection machine learning modules 162 may be trained by a training dataset that includes samples of data types labeled with one or more objects in each sample. For example, the training dataset may include sample images of objects (e.g., vehicles, lane markings, pedestrians, road signs, obstacles, etc.) labeled with object(s) in each sample image. Similarly, the training dataset may include samples of other data types, such as videos, infrared images, point clouds, radar data, etc. labeled with object(s) in each sample data. The object detection machine learning modules 162 may be trained, tested, and refined by the training dataset and the sensor data 130. The object detection machine learning modules 162 use the sensor data 130 (which are not labeled with objects) to increase their accuracy of predictions in detecting objects. For example, supervised and/or unsupervised machine learning algorithms may be used to validate the predictions of the object detection machine learning modules 162 in detecting objects in the sensor data 130.

Map data 164 may include a virtual map of a city or an area which includes the road 102, road 302 (see FIG. 3A), and road 502 (see FIG. 5). In some examples, the map data 164 may include the map 858 and map database 836 (see FIG. 8 for descriptions of the map 858 and map database 836). The map data 164 may include drivable areas, such as the road 102, paths, highways, and undrivable areas, such as terrain (determined by the occupancy grid module 860, see FIG. 8 for descriptions of the occupancy grid module 860). The map data 164 may specify location coordinates of road signs, lanes, lane markings, lane boundaries, road boundaries, traffic lights, obstacles, etc.

Routing plan 166 may include a plan for traveling from a start location (e.g., a first autonomous vehicle launchpad/landing pad) to a destination (e.g., a second autonomous vehicle launchpad/landing pad). For example, the routing plan 166 may specify a combination of one or more streets, roads, and highways in a specific order from the start location to the destination. The routing plan 166 may specify stages, including the first stage (e.g., moving out from a start location/launch pad), a plurality of intermediate stages (e.g., traveling along particular lanes of one or more particular street/road/highway), and the last stage (e.g., entering the destination/landing pad). The routing plan 166 may include other information about the route from the start position to the destination, such as road/traffic signs in that routing plan 166, etc.

Figure 8:
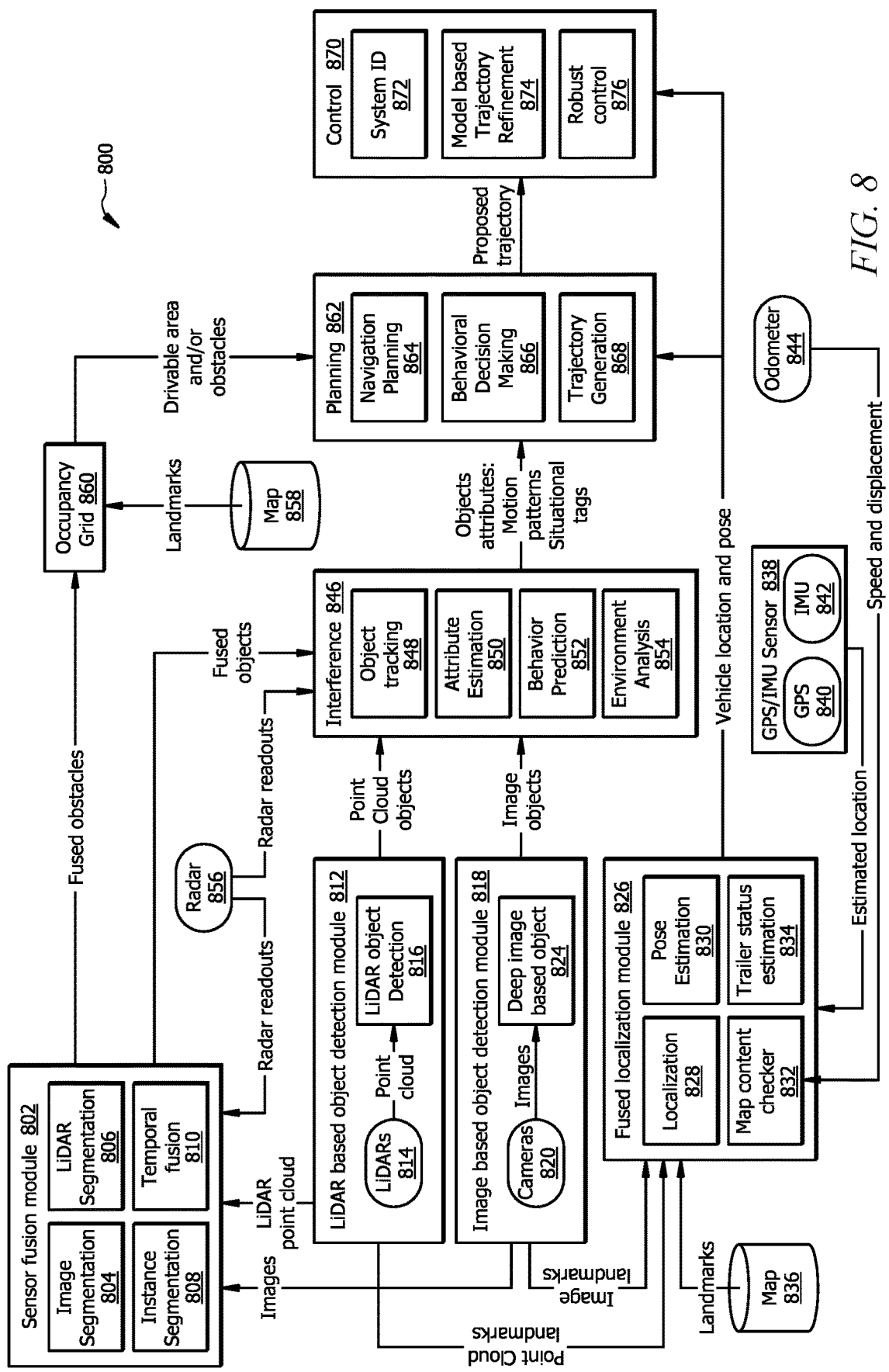
FIG. 8 illustrates an example system for providing autonomous driving operations used by the autonomous vehicle of FIG. 7.

Driving instructions 168 may be implemented by the planning module 862 (See descriptions of the planning module 862 in FIG. 8.). The driving instructions 168 may include instructions and rules to adapt the autonomous driving of the autonomous vehicle 702 according to the driving rules of each stage of the routing plan 166. For example, the driving instructions 168 may include instructions to stay within the speed range of a road 102 traveled by the autonomous vehicle 702, adapt the speed of the autonomous vehicle 702 with respect to observed changes by the sensors 746, such as speeds of surrounding vehicles, objects within the detection zones of the sensors 746, etc.

Operational Flow for Implementing Adaptive Light Distribution

The operational flow of system 100 begins when the control device 750 receives sensor data 130 from the sensors 746. In an example scenario, assume that the autonomous vehicle 702 is traveling along the road 102. While traveling along the road 102, the sensors 764 capture sensor data 130 that describes the environment around the autonomous vehicle 702. For example, the sensor data 130 may include an image 132 of one or more objects 104 on or around the road 102. In other examples, the sensor data 130 may include other data types, such as videos, infrared images, point clouds, radar data, etc. In some examples, the one or more objects 104 may include road signs, lane markings, lane boundaries, a pothole, and/or any other object 104. For example, assume that the sensors 746 detect the presence of the object 104 in front of the autonomous vehicle 702.

Determining Whether the a Particular Part of the Road does not Receive Enough Light The sensors 746 may communicate the sensor data 130 to the control device 750 for evaluation. The control device 750 may evaluate the image 132 to determine whether a light condition level 134 associated with a particular portion of the image 132 where the object 104 is shown is less than the threshold light level 136 (e.g., 70%, 75%, etc. of a predefined level). The light condition level 134 may include light contrast, luminance, intensity, and/or brightness levels. In other words, the control device 750 may determine whether a particular part of the road 102 where the object 104 is detected receives enough light or is shown dark in the image 132.

The control device 750 may determine the light condition level 134 by implementing an image processing algorithm 156 and/or the object detection machine learning modules 162. In this process, the control device 750 may determine pixel values 158 of each pixel of the image 132, where the pixel values 158 may be between 0 to 255 if each pixel value is represented by an 8-bit number. Each pixel value 158 may represent a color of each pixel in the image 132. For example, a pixel value 158 of 255 out of 255 may indicate that the color of the pixel is white; and a pixel value 158 of 0 out of 255 may indicate that the color of the pixel is black.

The control device 750 may determine the light condition level 134 by measuring a relative luminance or the difference between the highest pixel value 158 and lowest pixel value 158 in the image 132. If the difference between the highest pixel value 158 and lowest pixel value 158 in the image 132 is less than a threshold value 160, the control device 750 may determine that the light condition level 134 of the image 132 is less than the threshold light level 136.

If the control device 750 determines that the light condition level 134 on the particular portion of the image 132 where the object 104 shown is less than the threshold light level 136, the control device 750 may adjust the headlight 110 to increase illumination toward the object 104. In other words, the control device 750 may adjust the headlight 110 to increase the illumination on a particular part of the road 102 that is shown in the particular portion of the image 132 where the object 104 is shown. For example, the control device 750 may send a triggering signal 150 that indicates to emit the light distribution pattern 116b to the headlight 110. In the light distribution pattern 116b, the headlight 110 is adjusted to distribute more light toward the object 104.

Using a Feedback Loop to Adjust the Headlight Until Object(s) on the Road are Recognized The control device 750 may continue to receive one or more images 132 of the object 104 and increase the illumination on the particular part of the road 102 that is shown in the particular portion of the image 132 (e.g., toward the object 104) until it is determined that the light condition level 134 toward the object 104 is equal to or more than the threshold light level 136. For example, after adjusting the headlight 110 and increasing the illumination on the particular part of the road 102 that is shown in the particular portion of the image 132 (e.g., the object 104), the control device 750 may receive a second image 132 of the object 104 from the sensors 746. The control device 750 may determine whether the light condition level 134 on the particular portion of the second image 132 that shows the object 104 is still less than the threshold light level 136. If the control device 750 determines that the light condition level 134 on the particular portion of the second image 132 that shows the object 104 is still less than the threshold light level 136, the control device 750 may further adjust the headlight 110 to increase the illumination on the particular part of the road 102 (shown in the particular portion of the second image 132) until the light condition level 134 on the particular portion of the second image 132 is at least equal to the threshold light level 136.

Thus, the control device 750 may use a feedback loop until the light condition level 134 on the particular portion of the images 132 that shows the object 104 is equal to or more than the threshold light level 136.

In one embodiment, determining that the light condition level 134 of the image 132 is equal to or more than the threshold light level 136 may correspond to determining that an image quality level 152 associated with the image 132 is equal to or more than a threshold image quality level 154 (e.g., 70%, 75%, etc. of a predefined level).

For example, the control device 750 may determine that the image quality level 152 associated with the image 132 is equal to or more than the threshold image quality level 154 if the control device 750 determines that more than a threshold percentage of the objects 104 (e.g., more than 70%, 80%, etc. of the objects 104) in the image 132 are recognized using the object detection machine learning modules 162.

In one embodiment, the control device 750 may perform a similar operation for various portions of the image 132 until light condition levels 134 associated with various portions of the image 132 are equal to or more than the threshold light level 136. For example, the control device 750 may compare light condition levels 134 on various portions of the image 132 with the threshold light level 136. If the control device 750 determines that any of the light condition levels 134 on one or more portions of the image 132 is less than the threshold light level 136, the control device 750 may adjust the headlight 110 to increase illumination toward one or more parts of the road 102 shown in the one or more portions of the image 132.

The control device 750 may adjust the headlight 110 and the light distribution patterns 116 by adjusting one or more adjustment parameters 138, as described below.

Adapting the Headlight by Adjusting the Adjustment Parameter(s)

In one embodiment, the control device 750 may adjust the headlight 110 to increase the illumination on the particular part of the road 102 where the object 104 is detected by increasing the brightness level 140 associated with at least one section 114 of the headlight 110 that is facing the particular part of the road 102 where the object 104 is detected. For example, the control device 750 may send a triggering signal 150 to the headlight 110, where the triggering signal 150 may indicate to increase the brightness level 140 associated with the section 114a (and optionally section 114b). This may lead the headlight 110 to project the light distribution pattern 116b.

In one embodiment, the control device 750 may adjust the headlight 110 to increase the illumination on the particular part of the road 102 where the object 104 is detected by changing a position 142 of at least one section 114 of the headlight 110 toward the particular part of the road 102 where the object 104 is detected. In this process, the position 142 of the at least one section 114 of the headlight 110 may be changed by physically moving the at least one section 114 of the headlight 110 from one side of cab of the autonomous vehicle 702 to another, such as from left to right (or right to left); or up to down (or down to up); or any combination thereof. Thus, the light can be laterally translated either from left to right (or right to left); or up to down (or down to up); or any combination of these translations For example, the control device 750 may send a triggering signal 150 to the motor driver device 118, where the triggering signal 150 may indicate to change the position of (or move) the section 114c toward the object 104.

In one embodiment, the control device 750 may adjust the headlight 110 to increase the illumination on the particular part of the road 102 where the object 104 is detected by changing an angle 144 of at least one section 114 of the headlight 110 toward the particular part of the road 102 where the object 104 is detected. For example, changing the angle 144 of the at least one section 114 of the headlight 110 may include physically rotating or changing the angle 144 of the at least one section 114 of the headlight 110 from left to right (or right to left); or up to down (or down to up); or any combination thereof, so that the at least one section 114 of the headlight 110 is facing the object 104. For example, the control device 750 may send a triggering signal 150 to the motor driver device 118, where the triggering signal 150 may indicate to change the angle 144 of the section 114a toward the object 104, such that the section 114a is facing toward the object 104.

In one embodiment, the control device 750 may adjust the headlight 110 to increase the illumination on the particular part of the road 102 where the object 104 is detected by steering the light beam of the phased array light source 112 associated with the headlight 110 toward the particular part of the road 102 where the object 104 is detected.

Adapting the Headlight to Divert Light Distribution from the Oncoming Traffic

In some cases, while adjusting the illumination pattern 116 of the headlight 110, oncoming traffic might appear in front of the autonomous vehicle 702. In such cases, system 100 may be configured to divert the emitted light distribution 116 from the oncoming traffic while distributing light to other parts of the road 102 in front of the autonomous vehicle 702. In this manner, system 100 can avoid blinding drivers in the oncoming traffic. In the example of FIG. 1, assuming that the control device 750 has caused the headlight 110 to project the light distribution pattern 116b to emit more light toward the object 104, in an event where the oncoming traffic (e.g., vehicle 106) appears in front of the autonomous vehicle 702, the control device 750 may cause the headlight 110 to divert the light distribution from the oncoming traffic by causing the headlight 110 to change its light distribution to the light distribution pattern 116n, as described below.

Continuing the example scenario above, assume that the vehicle 106 on the other side of the road 102 is moving toward the autonomous vehicle 702. The sensors 746 may detect the presence of the vehicle 106, and may send sensor data 130 that includes data indicating the presence of the vehicle 106 to the control device 750, similar to that described above with respect to detecting the object 104. In response, the control device 750 may temporarily further adjust the headlight 110 to decrease the illumination toward the vehicle 106 until the vehicle 106 passes by the autonomous vehicle 702.

In some embodiments, the control device 750 may further adjust the headlight 110 to decrease the illumination toward the vehicle 106 by adjusting one or more adjustment parameters 138, as described below. This may lead the headlight 110 to project the light distribution pattern 116c where the illumination is diverted from the vehicle 106.

Diverting the Illumination from the Oncoming Traffic by Adjusting the Adjustment Parameter(s)

In one embodiment, the control device 750 may adjust the headlight 110 to divert the illumination from the vehicle 106 by decreasing the brightness level 140 associated with one or more sections 114 of the headlight 110 that is facing the vehicle 106, such as section 114a. For example, the control device 750 may send a triggering signal 150 to the headlight 110, where the triggering signal 150 may indicate to decrease the brightness level 140 associated with the section 114a (and optionally section 114b).

In one embodiment, the control device 750 may adjust the headlight 110 to divert the illumination from the vehicle 106 by changing a position 142 of at least one section 114 of the headlight 110 that is emitting light toward the vehicle 106 to another direction. For example, the control device 750 may send a triggering signal 150 to the motor driver device 118 to change the position of (or move) the sections 114 of the headlight 110 that are emitting light toward the vehicle 106, such as the section 114a to another direction.

In one embodiment, the control device 750 may adjust the headlight 110 to divert the illumination from the vehicle 106 by changing an angle 144 of at least one section 114 of the headlight 110 that is emitting light toward the vehicle 106, such as the section 114a to the opposite direction (or a neutral or default direction). For example, the control device 750 may adjust the headlight 110 to divert the illumination from the vehicle 106 by changing an angle 144 of at least one section 114 of the headlight 110 that is emitting light toward the vehicle 106 to point away from the vehicle 106. In the example of FIG. 1, since the vehicle 106 is detected on the front and left side of the autonomous vehicle 702, changing the angle 144 of the at least one section 114 of the headlight 110 may include physically rotating the at least one section 114 or changing the angle 144 of the at least one section 114 from left to right until the at least one section 114 is not facing the vehicle 106. In other examples, changing the angle 144 of the at least one section 114 of the headlight

110 may include physically rotating the at least one section 114 or changing the angle 144 of the at least one section 114 from left to right (or right to left); or up to down (or down to up); or any combination thereof.

In one embodiment, the control device 750 may adjust the headlight 110 to divert the illumination from the vehicle 106 by steering the light beam of the phased array light source 112 associated with the headlight 110 toward another direction, such as the opposite direction or a default direction. In the example of FIG. 1, since the vehicle 106 is detected on the front and left side of the autonomous vehicle 702, steering the light beam of the phased array light source 112 may include steering the light beam of the phased array light source 112 from left to right until the light is diverted from the vehicle 106. In other examples, steering the light beam of the phased array light source 112 may include steering the light beam of the phased array light source 112 from left to right (or right to left); or up to down (or down to up); or any combination thereof.

In one embodiment, the control device 750 may adjust the headlight 110 by emitting invisible light instead of visible light, as described below. For example, the control device 750 may cause the headlight 110 to change the frequency of the emitted light to a frequency of infrared light that is invisible, such as 400 THz, 390 THz, etc. The control device 750 may cause the frequency 146 of one or more sections 114 of the headlight 110 to change a desired frequency 146 by activating light sources 112 in the one or more sections 114 that are configured to propagate light the desired frequency 146 and deactivate the other light sources 112 in the one or more sections 114.

In one embodiment, the control device 750 may adjust the headlight 110 by changing a frequency 146 of light sources 112 in one or more sections 114 of the headlight 110 that are emitting light toward the vehicle 106. For example, the control device 750 may send a triggering signal 150 to the headlight 110, where the triggering signal 150 may indicate to change the frequency 146 of the section 114a that is emitting light toward the vehicle 106 to another frequency 146 that is invisible, such as any frequency 146 associated with invisible light, e.g., 400 THz, 390 THz, etc.

In one embodiment, the control device 750 may adjust the headlight 110 by changing a wavelength 148 of light sources 112 in one or more sections 114 of the headlight 110 that are emitting light toward the vehicle 106. For example, the control device 750 may cause the headlight 110 to change the wavelength 148 of the light sources 112 to a wavelength 148 associated with infrared light, such as 700 nm, 750 nm, etc. The control device 750 may cause the wavelength 148 of one or more sections 114 of the headlight 110 to change a desired wavelength 148 by activating light sources 112 in the one or more sections 114 that are configured to propagate light with the desired wavelength 148 and deactivate the other light sources 112 in the one or more sections 114. For example, the control device 750 may send a triggering signal 150 to the headlight 110, where the triggering signal 150 may indicate to change the wavelength 148 of the section 114a that is emitting light toward the vehicle 106 to another wavelength 148 that is invisible.

In one embodiment, the control device 750 may adjust the headlight 110 by steering the light beam emitted from the phased array light source 112 to point away from the vehicle 106, such as in the opposite direction compared to where the vehicle 106 is detected. In the example of FIG. 1, since the vehicle 106 is detected on the front and left side of the autonomous vehicle 702, steering the light beam of the phased array light source 112 may include steering the light beam of the phased array light source 112 from left to right until the light is diverted from the vehicle 106.

Example Method for Implementing an Adaptive Light Distribution for Autonomous Vehicles FIG. 2 illustrates an example flowchart of a method 200 for implementing an adaptive light distribution 116 for autonomous vehicles 702. Modifications, additions, or omissions may be made to method 200. Method 200 may include more, fewer, or other operations. For example, operations may be performed in parallel or in any suitable order. While at times discussed as the autonomous vehicle 702, control device 750, headlight 110, or components of any of thereof performing operations, any suitable system or components of the system may perform one or more operations of the method 200. For example, one or more operations of method 200 may be implemented, at least in part, in the form of software instructions 128 and processing instructions 780, respectively, from FIGS. 1 and 7, stored on non-transitory, tangible, machine-readable media (e.g., memory 126 and data storage 790, respectively, from FIGS. 1 and 7) that when run by one or more processors (e.g., processors 122 and 770, respectively, from FIGS. 1 and 7) may cause the one or more processors to perform operations 202-216.

Method 200 begins at 202 where the control device 750 receives sensor data 130 from the sensors 746 associated with the autonomous vehicle 702, where the sensor data 130 comprises an image 132 of one or more objects 104 on or around the road 102 ahead of the autonomous vehicle 702. For example, the sensors 746 may capture sensor data 130 that includes the image 132 of the environment around the autonomous vehicle 702. In other examples, the sensor data 130 may include other data types, such as videos, infrared images, point clouds, radar data, etc. The sensors 746 send the sensor data 130 to the control device 750, similar to that described in FIG. 1. The sensors 746 may send the sensor data 130 to the control device 750 continuously, periodically (e.g., every second, every minute, etc.), or on-demand.

At 204, the control device 750 may determine one or more light condition levels 134 associated with one or more portions of the image 132. For example, the light condition levels 134 may include light contrast, luminance, intensity, and/or brightness levels. The control device 750 may determine one or more light condition levels 134 associated with one or more portions of the image 132 by implementing the image processing algorithm 256 and/or the object detection machine learning modules 162, similar to that described in FIG. 1.

At 206, the control device 750 compares each of the one or more light condition levels 134 with the threshold light level 136. The threshold light level 136 may be 70%, 75%, etc. of a predefined level.

At 208, the control device 750 may determine whether a light condition level 134 on a particular portion of the image 132 is less than the threshold light level 136. In this process, the control device 750 may compare each of the one or more light condition levels 134 associated with the one or more portions of the image 132 with the threshold light level 136. If the control device 750 determines that the light condition level 134 on the particular portion of the image 132 is less than the threshold light level 136, method 200 proceeds to operation 212. Otherwise, method 200 proceeds to operation 210.

At 210, the control device 750 does not adjust the headlight 110 mounted on the autonomous vehicle 702. For example, the headlight 110 may emit the default illumination pattern 116a.

At 212, the control device 750 may adjust the headlight 110 to increase illumination on a particular part of the road 102 that is shown in the particular part of the image 132. In this process, the control device 750 may adjust the headlight 110 by adjusting one or more of the adjustment parameters 138, similar to that described in FIG. 1. For example, the control device 750 may trigger the headlight 110 to emit the illumination pattern 116b, similar to that described in FIG. 1. In one embodiment, the control device 750 may perform operations 214 and 216 in cases where the control device 750 detects oncoming traffic.

At 214, the control device 750 may detect that a vehicle 106 on the other side of the road 102 is moving toward the autonomous vehicle 702, where the vehicle 106 is on the particular part of the road 102 (that the headlight 110 is adjusted to increase the illumination on). In this process, the control device 750 may receive another sensor data 130 from the sensors 746, where the other sensor data 130 may include data that indicates the presence of the vehicle 106 on the particular part of the road 102, similar to that described in FIG. 1.

At 216, the control device 750 may temporarily adjust the headlight 110 to decrease the illumination projected toward the vehicle 106 until the vehicle 106 passes by the autonomous vehicle 702. In this process, the control device 750 may adjust the headlight 110 by adjusting one or more adjustment parameters 138, similar to that described in FIG. 1.

Example System for Communicating a Driving Mode of an Autonomous Vehicle

FIGS. 3A and 3B illustrate an embodiment of a system 300 for communicating a driving mode 322 associated with an autonomous vehicle 702. FIG. 3A further illustrates a simplified schematic diagram of a road 302 traveled by an autonomous vehicle 702. In one embodiment, system 300 comprises an autonomous vehicle 702 and its components, such as the control device 750, sensors 746, a notification device 310, and a transceiver device 318. In some embodiments, system 300 further comprises a network 360. Network 360 enables communication between the autonomous vehicle 702 and other vehicles 304. Aspects of the autonomous vehicle 702, the control device 750, and the sensors 746 are described above in FIG. 1, and additional aspects are described below.

The control device 750 comprises the processor 122 in signal communication with the memory 126. The memory 126 stores software instructions 320 that when executed by the processor 122, cause the processor 122 to execute one or more functions described herein. For example, when the software instructions 320 are executed, the processor 122 may trigger the notification device 310 and/or the transceiver device 318 to communicate a driving mode 322 associated with the autonomous vehicle 702 to other vehicles 304 (and by extension to bicycle riders and pedestrians). The system 300 may be configured as shown or in any other suitable configuration.

In general, the system 300 may be configured to notify other vehicles 304 around the autonomous vehicle 702 about the driving mode 322 associated with the autonomous vehicle 702. If the autonomous vehicle 702 is operating in an autonomous mode 324, system 300 notifies the other vehicles 304 that the autonomous vehicle 702 is operating in the autonomous mode 324. If the autonomous vehicle 702 is operating in a non-autonomous mode 326, system 300 notifies the other vehicles 304 that the autonomous vehicle 702 is operating in the non-autonomous mode 326.

The system 300 may be configured to notify the other vehicles 304 about the driving mode 322 associated with the autonomous vehicle 702 in various ways. For example, the system 300 may indicate the driving mode 322 associated with the autonomous vehicle 702 by presenting a visual notification 330, such as one or more media items 332, e.g., text 334, an image 336, and/or a video 338. In another example, the system 300 may indicate the driving mode 322 associated with the autonomous vehicle 702 by communicating a data message 340 to the other vehicles 304 that are in a Vehicle-to-Vehicle (V2V) communication range 314 from the autonomous vehicle 702, and configured to receive data messages 340, such as autonomous vehicles 304b. These operations are described further below in conjunction with the operational flow of the system 300.

System Components

Aspects of the control device 750 are described above in FIGS. 1-2, and additional aspects are described below. The memory 126 may be further configured to store software instructions 320, driving modes 322, visual notifications 330, autonomous vehicle metadata 350, radius 308, data message 340, sensor data 342, and triggering signals 344.

Example Notification Device

Notification device 310 may generally include any device that is configured to present a visual notification 330. The notification device 310 may include a processor module (e.g., a microprocessor) communicatively coupled with a memory that stores data and instructions used by the processor to perform its functions. The notification device 310 may be communicatively coupled with the control device 750, for example, by wireless communication protocols, such as WiFi, Bluetooth, etc. or by wires. The notification device 310 may be controlled by the control device 750 to present the visual notification 330.

In one embodiment, the notification device 310 may comprise one or more light sources or flashing light sources, such as LEDs, light bulbs, among other light sources. The light sources may include colored light sources. Thus, indicating that the autonomous vehicle 702 is operating in an autonomous mode 324 may include powering on light sources with a first color (e.g., green), and indicating that the autonomous vehicle 702 is operating in a non-autonomous mode 326 may include powering on light sources with a second color (e.g., red).

Various embodiments of the notification device 310 are described in FIG. 3B. Referring to FIG. 3B, in one embodiment, the notification device 310 may comprise a two-dimensional LED board that is configured to present any visual notification 330 that indicates the driving mode 322 associated with the autonomous vehicle 702.

In one embodiment, the notification device 310 may comprise a device, such as a display screen that is configured to display any visual notification 330 that indicates the driving mode 322 associated with the autonomous vehicle 702.

In one embodiment, one or more of the notification device 310 may be located or mounted on one or more sides of the autonomous vehicle 702. For example, one or more of the notification device 310 may be mounted on each of the back, left, right, front, and/or top sides of the autonomous vehicle 702.

In one embodiment, one or more of the notification device 310 may be located or mounted around the rear-view windows of the autonomous vehicle 702.

Example Transceiver Device

Referring back to FIG. 3A, transceiver device 318 may comprise a radio communication module, and may be generally configured to communicate data messages 340 with other radio communication modules. The transceiver device 318 may include a processor module (e.g., a microprocessor) communicatively coupled with a memory that stores data and instructions used by the processor to perform its functions. The transceiver device 318 may be configured to operate in one or more radio frequency bands compatible with one or more wireless communication systems, such as Bluetooth, 4G, 5G, LTE, etc. The transceiver device 318 may be communicatively coupled with the control device 750, for example, by wireless communication protocols, such as WiFi, Bluetooth, etc., or by wires. The transceiver device 318 may be controlled by the control device 750 to communicate a data message 340 that indicates the driving mode 322 associated with the autonomous vehicle 702 to other vehicles 304 that are in the V2V communication range 314 with respect to the autonomous vehicle 702, and configured to receive data messages 340, such as autonomous vehicles 304b.

Network

Network 360 may be any suitable type of wireless and/or wired network, including all or a portion of the Internet, an Intranet, a private network, a public network, a peer-to-peer network, the public switched telephone network, a cellular network, a local area network (LAN), a metropolitan area network (MAN), a wide area network (WAN), and a satellite network. The network 360 may be configured to support any suitable type of communication protocol as would be appreciated by one of ordinary skill in the art.

Operational Flow for Communicating a Driving Mode of an Autonomous Vehicle

Communicating the Driving Mode of the Autonomous Vehicle Using the Notification Device In one embodiment, the control device 750 may use the notification device 310 to communicate the driving mode 322 associated with the autonomous vehicle 702 to other vehicles 304.

In this embodiment, the control device 750 may trigger the notification device 310 to present a visual notification 330 that indicates the driving mode 322 associated with the autonomous vehicle 702. To this end, the control device 750 defines a threshold region 306 around the autonomous vehicle 702. The threshold region 306 may have a radius 308. The radius 308 may be any suitable value, such as forty feet, fifty feet, etc. The control device 750 may define the threshold region 306 such that the visual notification 330 is visible at a border of the threshold region 306.

In an example operation, assume that the autonomous vehicle 702 is traveling along the road 302. The autonomous vehicle 702 may be operated by the control device 750 to drive in the autonomous mode 324.

While traveling along the road 302, the sensors 746 associated with the autonomous vehicle 702 capture sensor data 342. The sensor data 342 may include images, videos, point clouds, radar data, among other data types that describe the environment around the autonomous vehicle 702. In this example, assume that the sensors 746 detect the presence of the vehicle 304a. Thus, the sensor data 342 may indicate the presence of the vehicle 304a.

The sensors 746 may communicate the sensor data 342 to the control device 750. The control device 750 may detect the presence of the vehicle 304a from the sensor data 342, for example, by implementing the object detection machine learning modules 162, similar to that described in FIG. 1.

The control device 750 may determine a distance 312 between the vehicle 304a and the autonomous vehicle 702. The control device 750 compares the distance 312 with the threshold region radius 308. The control device 750 may determine whether the distance 312 is less or more than the threshold region radius 308. In other words, the control device 750 may determine whether the vehicle 304a is within the threshold region 306.

In the illustrated example of FIG. 3A, the control device 750 may determine that the vehicle 304a is within the threshold region 306 based on determining that the distance 312 is within the threshold region 306.

In response, the control device 750, may trigger the notification device 310 to indicate that the autonomous vehicle 702 is operating in the autonomous mode 324. In this process, the control device 750 may send a triggering signal 344 to the notification device 310, where the triggering signal 344 indicates to present a visual notification 330 that indicates the autonomous vehicle 702 is operating in the autonomous mode 324.

Similarly, the control device 750 may detect the presence of multiple vehicles 304 within the threshold range 306 and trigger the notification device 310 to indicate the driving mode 322 associated with the autonomous vehicle 702.

Similarly, the control device 750 may detect the presence of one or more pedestrians, bicycle riders, etc. within the threshold range 306 and trigger the notification device 310 to indicate the driving mode 322 associated with the autonomous vehicle 702.

Indicating that the Autonomous Vehicle is Operating in the Autonomous Mode

In an embodiment where the notification device 310 comprises one or more light sources, indicating that the autonomous vehicle 702 is operating in the autonomous mode 324 may comprise powering on the one or more light sources (or colored light sources).

In an embodiment where the notification device 310 comprises a two-dimensional LED board, indicating that the autonomous vehicle 702 is operating in the autonomous mode 324 may comprise displaying a symbol (e.g., colored light), text 334, image 336, and/or video 338 that indicates the autonomous vehicle 702 is operating in the autonomous mode 324 on the LED board.

In an embodiment where the notification device 310 comprises a display screen, indicating that the autonomous vehicle 702 is operating in the autonomous mode 324 may comprise displaying a symbol (e.g., colored light), text 334, image 336, and/or video 338 that indicates the autonomous vehicle 702 is operating in the autonomous mode 324 on the display screen.

If the control device 750 determines that there are no vehicles 304, pedestrians, bicycle riders, etc. in the threshold region 306, the control device 750 may turn off the notification device 310.

Indicating that the Autonomous Vehicle is Operating in the Non-Autonomous Mode

In cases where the autonomous vehicle 702 is operating in the non-autonomous mode 326, the control device 750 may trigger the notification device 310 to present a visual notification 330 that indicates the autonomous vehicle 702 is operating in the non-autonomous mode 326.

On roads where operating the autonomous vehicle 702 in the autonomous mode 324 is not considered safe, a driver may be requested to drive the autonomous vehicle 702 until the autonomous vehicle 702 reaches a road where operating the autonomous vehicle 702 in the autonomous mode 324 is considered safe. Thus, in such cases, the autonomous vehicle 702 may operate in the non-autonomous mode 326, i.e., operated by a driver.

In an embodiment where the notification device 310 comprises one or more light sources, indicating that the autonomous vehicle 702 is operating in the non-autonomous mode 326 may comprise powering off the one or more light sources.

In an embodiment where the notification device 310 comprises a two-dimensional LED board, indicating that the autonomous vehicle 702 is operating in the non-autonomous mode 326 may comprise displaying a symbol (e.g., colored light), text 334, image 336, and/or video 338 that indicates the autonomous vehicle 702 is operating in the non-autonomous mode 326 on the LED board.

In an embodiment where the notification device 310 comprises a display screen, indicating that the autonomous vehicle 702 is operating in the non-autonomous mode 326 may comprise displaying a symbol (e.g., colored light), text 334, image 336, and/or video 338 that indicates the autonomous vehicle 702 is operating in the non-autonomous mode 326 on the display screen.

Communicating the Driving Mode of the Autonomous Vehicle Using the Transceiver Device In one embodiment, the control device 750 may use the transceiver device 318 to communicate the driving mode 322 associated with the autonomous vehicle 702 to other vehicles 304 that are in the V2V communication range 314 from the autonomous vehicle 702, and configured to receive data messages 340, such as vehicle 304b, e.g., via the network 360.

In one embodiment, the vehicle 304b may be an autonomous vehicle that is configured to receive data messages 340. In another embodiment, the vehicle 304b may be a non-autonomous vehicle that includes a communication module that is configured to receive data messages 340.

In an example operation, assume that the autonomous vehicle 702 is traveling along the road 302. The sensors 746 associated with the autonomous vehicle 702 capture sensor data 342, and send the sensor data 342 to the control device 750, similar to that described above. In this example, assume that the sensors 746 detect the presence of the vehicle 304b. Thus, the sensor data 342 may indicate the presence of the vehicle 304b.

Upon receiving the sensor data 342, the control device 750 may detect the presence of the vehicle 304b from the sensor data 342, for example, by implementing the object detection machine learning modules 162, similar to that described in FIG. 1.

The control device 750 may determine the distance 316 between the autonomous vehicle 702 and the vehicle 304b. In the example of FIG. 3A, the control device 750 may determine that the distance 316 between the autonomous vehicle 702 and the vehicle 304b is less than the V2V communication range 314. In response, the control device 750 may trigger the transceiver device 318 to transmit a data message 340 on the one or more radio frequency bands to the vehicle 304b.

The data message 340 may include autonomous vehicle metadata 350 including an autonomous vehicle type 352, a software version 354 associated with the autonomous vehicle 702, navigation maneuver(s) 356 associated with the autonomous vehicle 702, and an identifier 358 associated with the autonomous vehicle 702. The autonomous vehicle type 352 may indicate that the autonomous vehicle 702 is a semi-truck tractor unit attached to a trailer (see FIG. 7) or any other type. The software version 354 may indicate the current software version 354 that is installed to operate the autonomous vehicle 702 and/or the control device 750. The navigation maneuver(s) 356 may indicate one or more following or next navigation maneuvers of the autonomous vehicle 702, including changing to a particular lane at a particular time, taking a particular exit at a particular time, and continuing on the current lane for a particular time period. The identifier 358 may include a number that uniquely identifies the autonomous vehicle 702.

In one embodiment, the control device 750 may detect that the vehicle 304b is an autonomous vehicle by implementing the object detection machine learning modules 162. For example, the control device 750 may detect the presence of the vehicle 304b and that the vehicle 304b is an autonomous vehicle based on analyzing the sensor data 342 and determining that the sensor data 342 indicate that there is no driver in the vehicle 304b. In another example, the control device 750 may detect the presence of the vehicle 304b and that the vehicle 304b is an autonomous vehicle based on analyzing the sensor data 342 and determining that the sensor data 342 indicates that a model or type of the vehicle 304b matches one of a plurality of autonomous vehicle models.

In one embodiment, the control device 750 may increase or decrease the distance 316 between the autonomous vehicle 702 and the vehicle 304b in response to detecting the presence of the vehicle 304b, and determining that the vehicle 304b is an autonomous vehicle, e.g., by decreasing or increasing the speed of the autonomous vehicle 702.

FIG. 3B illustrates various embodiments of the notification device 310. Aspects of the notification device 310 are described above in FIG. 3A, and additional aspects are described below. As can be seen in FIG. 3B, one or more of the notification device 310 may be mounted on one or more sides of the autonomous vehicle 702, such as on top of the cab of the autonomous vehicle 702, on top of the trailer of the autonomous vehicle 702, on any number and combination of sides of the trailer of the autonomous vehicle 702, on the back of the trailer of the autonomous vehicle 702, or on the rear-view windows of the autonomous vehicle 702. In other examples, the notification device 310 may mounted on any other location on the autonomous vehicle 702 where it can be seen by surrounding vehicles, drones, or the human operators thereof. It should be understood that the placement, size, scale and orientation of the notification device(s) 310 may be adjusted from those illustrated in FIG. 3B to fit various needs.

Example Method for Communicating a Driving Mode of an Autonomous Vehicle

FIG. 4 illustrates an example flowchart of a method 400 for communicating a driving mode 322 of an autonomous vehicle 702. Modifications, additions, or omissions may be made to method 400. Method 400 may include more, fewer, or other operations. For example, operations may be performed in parallel or in any suitable order. While at times discussed as the autonomous vehicle 702, control device 750, notification device 310, transceiver device 318, or components of any of thereof performing operations, any suitable system or components of the system may perform one or more operations of the method 400. For example, one or more operations of method 400 may be implemented, at least in part, in the form of software instructions 320 and processing instructions 780, respectively, from FIGS. 3A and 7, stored on non-transitory, tangible, machine-readable media (e.g., memory 126 and data storage 790, respectively, from FIGS. 3A and 7) that when run by one or more processors (e.g., processors 122 and 770, respectively, from FIGS. 3A and 7) may cause the one or more processors to perform operations 402-422.

Method 400 begins at operation 402 where the control device defines a threshold region 306 around the autonomous vehicle 702. The control device 750 may define the threshold region 306 such that a visual notification 330, such as a media item 332 is visible at a of the threshold region 306.

At 404, the control device 750 receives sensor data 342 from the sensors 746 associated with the autonomous vehicle 702. In some examples, the sensor data 342 may include any data type, such as images, videos, infrared images, point clouds, radar data, etc. The control device 750 may receive the sensor data 342 continuously, periodically (e.g., every second, every minute, etc.), or on-demand.

At 406, the control device 750 may detect the presence of a first vehicle 304a from the sensor data 342. The control device 750 may implement the object detection machine learning modules 162 to detect the presence of the first vehicle 304a.

At 408, the control device 750 may determine a distance 312 between the autonomous vehicle 702 and the first vehicle 304a.

At 410, the control device 750 may determine whether the first vehicle 304a is within the threshold region 306. In this process, the control device 750 compares the distance 312 between the autonomous vehicle 702 and the first vehicle 304a with the threshold region radius 308. If the control device 750 determines that the first vehicle 304a is within the threshold region 306, method 400 proceeds to operation 412. Otherwise, method 400 proceeds to operation 414.

At 412, the control device 750 may trigger the notification device 310 associated with the autonomous vehicle 702 to notify the first vehicle 304a that the autonomous vehicle 702 is operating in the autonomous mode 324. For example, the control device 750 may trigger the notification device 310 to present one or more visual notifications 330, similar to that described in FIGS. 3A and 3B.

At 414, the control device 750 does not trigger the notification device 310. In one embodiment, the control device 750 may perform operations 416-422 if the control device 750 detects the presence of one or more autonomous vehicles 304.

At 416, the control device 750 may detect the presence of a second vehicle 304b from the sensor data 342, similar to that described in FIG. 3A.

At 418, the control device 750 may determine whether the second vehicle 304b is within the V2V communication range 314 from the autonomous vehicle 702. In this process, the control device 750 may determine a distance 316 between the autonomous vehicle 702 and the second vehicle 304b, and determine whether the distance 316 is within the V2V communication range 314, similar to that described in FIG. 3A. If the control device 750 determines that the second vehicle 304b is within the V2V communication range 314, method 400 proceeds to operation 420. Otherwise, method 400 proceeds to operation 422.

At 420, the control device 750 may trigger the transceiver device 318 associated with the autonomous vehicle 702 to notify the second vehicle 304b that the autonomous vehicle 702 is operating in the autonomous mode 324. For example, the control device 750 may trigger the transceiver device 318 to indicate that the autonomous vehicle 702 is operating in the autonomous mode 324, and may send the data message 340 that includes the autonomous vehicle metadata 350, similar to that described in FIG. 3A.

At 422, the control device 750 does not trigger the transceiver device 318.

Example System for Granting Access to an Autonomous Vehicle

FIG. 5 illustrates an embodiment of a system 500 for granting access to an autonomous vehicle 702. FIG. 5 further illustrates a simplified schematic diagram of a road 502 traveled by the autonomous vehicle 702. In one embodiment, system 500 comprises an autonomous vehicle 702 and its components, a network 508, an electronic device 580, and an oversight server 560. Network 508 enables communication between components of the system 500. The control device 750 comprises the processor 122 in signal communication with the memory 126. The memory 126 stores software instructions 524 that when executed by the processor 122, cause the processor 122 to execute one or more functions described herein. The oversight server 560 comprises a processor 562 in signal communication with a memory 568. Memory 568 stores software instructions 570 that when executed by the processor 562, cause the processor 562 to execute one or more functions described herein. The system 500 may be configured as shown or in any other suitable configuration.

In general, system 500 may be configured to receive a request to grant access to the autonomous vehicle 702, receive a credential 530 associated with a user 504, determine whether the credential 530 is valid, and if it is determined that the received credential 530 is valid, grant access to the autonomous vehicle 702. Each of the these operations is described further below in conjunction with an operational flow of the system 500.

System Components

Aspects of the control device 750 are described above in FIGS. 1-4, and additional aspects are described below. The memory 126 is further configured to store software instructions 528, signal 526, credentials 530, sensor data 538, user profiles 546, and autonomous vehicle metadata 548.

Network

Network 508 may be any suitable type of wireless and/or wired network, including all or a portion of the Internet, an Intranet, a private network, a public network, a peer-to-peer network, the public switched telephone network, a cellular network, a local area network (LAN), a metropolitan area network (MAN), a wide area network (WAN), and a satellite network. The network 508 may be configured to support any suitable type of communication protocol as would be appreciated by one of ordinary skill in the art.

Example Communication Device

Communication device 510 may generally include any device that is configured to process data and interact with users. Examples of the communication device 510 include, but are not limited to, a computing device, a laptop, a tablet computer, a mobile phone (such as a smartphone), etc. The communication device 510 is communicatively coupled with the control device 750, for example, by wireless communication protocols, such as WiFi, Bluetooth, etc., (e.g., via network 508) or by wires.

The communication device 510 comprises a processor 512 in signal communication with a network interface 514, biometric feature scanners 516, user interfaces 518, a camera 520, and a memory 522. The memory 522 stores software instructions 524 that when executed by the processor 512, cause the processor 512 to perform one or more functions of the communication device 510 described herein.

In general, the communication device 510 may be used to interact with the user 504 that requests the autonomous vehicle 702 to pull over. For example, the communication device 510 may receive a signal 526 from the electronic device 580 associated with the user 504, where the signal 526 indicates that the user 504 requests the autonomous vehicle 702 to pull over. This process is described further below in conjunction with the operational flow of the system 500.

Processor 512 comprises one or more processors operably coupled to the memory 522. The processor 512 may include any electronic circuitry, including state machines, one or more central processing unit (CPU) chips, logic units, cores (e.g., a multi-core processor), field-programmable gate array (FPGAs), application-specific integrated circuits (ASICs), or digital signal processors (DSPs). The processor 512 may be a programmable logic device, a microcontroller, a microprocessor, or any suitable combination of the preceding. The one or more processors are configured to process data and may be implemented in hardware or software. For example, the processor 512 may be 8-bit, 16-bit, 32-bit, 64-bit, or of any other suitable architecture. The processor 512 may include an arithmetic logic unit (ALU) for performing arithmetic and logic operations. The processor 512 may register the supply operands to the ALU and store the results of ALU operations. The processor 512 may further include a control unit that fetches instructions from memory and executes them by directing the coordinated operations of the ALU, registers, and other components. The one or more processors are configured to implement various instructions. For example, the one or more processors are configured to execute instructions (e.g., software instructions 524) to perform one or more functions of the communication device 510. In this way, processor 512 may be a special-purpose computer designed to implement the functions disclosed herein. In an embodiment, the processor 512 is implemented using logic units, FPGAs, ASICs, DSPs, or any other suitable hardware. The processor 512 is configured to operate as described in FIGS. 5-6.

Network interface 124 is configured to enable wired and/or wireless communications (e.g., via network 508). The network interface 124 may be configured to communicate data between the communication device 510 and other devices, databases, systems, or domains. For example, the network interface 124 may comprise a WIFI interface, a local area network (LAN) interface, a wide area network (WAN) interface, a modem, a switch, or a router. The processor 512 is configured to send and receive data using the network interface 124. The network interface 124 may be configured to use any suitable type of communication protocol as would be appreciated by one of ordinary skill in the art.

The biometric feature scanners 516 may include a fingerprint scanner, a retinal scanner, a voice recognition module, among other biometric scanners. Each biometric feature scanner 516 may implement machine learning processing algorithms to capture a sample of a biometric feature (e.g., fingerprint, retinal, voice, etc.) of a user 504 and extract features that uniquely identify the user 504. The biometric feature scanners 516 may be used to validate the identity of a user 504 that requests to pull over the autonomous vehicle 702. This process is described further below in conjunction with the operational flow of the system 500.

The user interfaces 518 may include a display, a microphone, keypad, or other appropriate terminal equipment usable by a user 504.

The memory 522 stores any of the information described in FIGS. 5-6 along with any other data, instructions, logic, rules, or code operable to implement the function(s) described herein when executed by processor 512. For example, the memory 522 may store software instructions 524, signal 526, credentials 530, and/or any other data/instructions. The software instructions 524 include code that when executed by the processor 512 causes the communication device 510 to perform the functions described herein, such as some or all of those described in FIGS. 5-6. The memory 522 comprises one or more disks, tape drives, or solid-state drives, and may be used as an over-flow data storage device, to store programs when such programs are selected for execution, and to store instructions and data that are read during program execution. The memory 522 may be volatile or non-volatile and may comprise read-only memory (ROM), random-access memory (RAM), ternary content-addressable memory (TCAM), dynamic random-access memory (DRAM), and static random-access memory (SRAM). The memory 522 may include one or more of a local database, cloud database, network-attached storage (NAS), etc.

In one embodiment, the communication device 510 may be a separate device from the control device 750. In another embodiment, the communication device 510 may be integrated with the control device 750.

In one embodiment, the communication device 510 may be located in a compartment 556 external to the cab of the autonomous vehicle 702. Thus, in this embodiment, the communication device 510 may be accessible from outside of the autonomous vehicle 702.

In one embodiment, the communication device 510 may be located inside the cab of the autonomous vehicle 702. Thus, in this embodiment, in order to access the communication device 510, a door of the autonomous vehicle 702 may first be unlocked.

Example Oversight Server

Oversight server 560 is generally configured to oversee the operations of the autonomous vehicle 702. The oversight server 560 comprises a processor 562, a network interface 564, a user interface 566, and a memory 568. The components of the oversight server 560 are operably coupled to each other. The processor 562 may include one or more processing units that perform various functions as described herein. The memory 568 stores any data and/or instructions used by the processor 562 to perform its functions. For example, the memory 568 stores software instructions 570 that when executed by the processor 562 causes the oversight server 560 to perform one or more functions described herein. The oversight server 560 may be configured as shown or in any other suitable configuration.

In one embodiment, the oversight server 560 may be implemented by a cluster of computing devices that may serve to oversee the operations of the autonomous vehicle 702. For example, the oversight server 560 may be implemented by a plurality of computing devices using distributed computing and/or cloud computing systems. In another example, the oversight server 560 may be implemented by a plurality of computing devices in one or more data centers. As such, in one embodiment, the oversight server 560 may include more processing power than the control device 750. The oversight server 560 is in signal communication with the autonomous vehicle 702 and its components (e.g., the control device 750). In one embodiment, the oversight server 560 is configured to determine a particular routing plan 166 for the autonomous vehicle 702. For example, the oversight server 560 may determine a particular routing plan 166 for an autonomous vehicle 702 that leads to reduced driving time and a safer driving experience for reaching the destination of that autonomous vehicle 702.

Processor 562 comprises one or more processors. The processor 562 is any electronic circuitry, including state machines, one or more central processing unit (CPU) chips, logic units, cores (e.g., a multi-core processor), field-programmable gate array (FPGAs), application-specific integrated circuits (ASICs), or digital signal processors (DSPs). The processor 562 may be a programmable logic device, a microcontroller, a microprocessor, or any suitable combination of the preceding. The processor 562 may be communicatively coupled to and in signal communication with the network interface 564, user interface 566, and memory 568. The one or more processors are configured to process data and may be implemented in hardware or software. For example, the processor 562 may be 8-bit, 16-bit, 32-bit, 64-bit or of any other suitable architecture. The processor 562 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute software instructions 570 to implement the functions disclosed herein, such as some or all of those described with respect to FIGS. 5-6. In some embodiments, the function described herein may be implemented using logic units, FPGAs, ASICs, DSPs, or any other suitable hardware or electronic circuitry.

Network interface 564 may be configured to enable wired and/or wireless communications. The network interface 564 may be configured to communicate data between the oversight server 560 and other network devices, systems, or domain(s). For example, the network interface 564 may comprise a WIFI interface, a local area network (LAN) interface, a wide area network (WAN) interface, a modem, a switch, or a router. The processor 562 may be configured to send and receive data using the network interface 564. The network interface 564 may be configured to use any suitable type of communication protocol.

User interfaces 566 may include one or more user interfaces that are configured to interact with users, such as the remote operator 584. The remote operator 584 may access the oversight server 560 via the communication path 586. The user interfaces 566 may include peripherals of the oversight server 560, such as monitors, keyboards, mouse, trackpads, touchpads, etc. The remote operator 584 may use the user interfaces 566 to access the memory 568 to review the credentials 530 and other data stored in the memory 568.

Memory 568 stores any of the information described in FIGS. 1-9 along with any other data, instructions, logic, rules, or code operable to implement the function(s) described herein when executed by processor 562. For example, the memory 568 may store software instructions 570, credentials 530, routing plan 166, autonomous vehicle metadata 548, message 572, and/or any other data/instructions. The software instructions 128 include code that when executed by the processor 562 causes the oversight server 560 to perform the functions described herein, such as some or all of those described in FIGS. 5-6. The memory 568 comprises one or more disks, tape drives, or solid-state drives, and may be used as an over-flow data storage device, to store programs when such programs are selected for execution, and to store instructions and data that are read during program execution. The memory 568 may be volatile or non-volatile and may comprise read-only memory (ROM), random-access memory (RAM), ternary content-addressable memory (TCAM), dynamic random-access memory (DRAM), and static random-access memory (SRAM). The memory 568 may include one or more of a local database, cloud database, network-attached storage (NAS), etc.

Example Electronic Device

Electronic device 580 may be any computing device that is configured to receive data from and transmit data to other computing devices, such as the communication device 510. The electronic device 580 is capable of communicating with users 504, for example, via user interfaces. Examples of the electronic device 580 include, but are not limited to, a mobile phone, a laptop, a tablet computer, etc. The electronic device 580 may include a hardware processor, memory, and/or circuitry configured to perform any of the functions or actions of the electronic device 580 described herein. For example, a software application designed using software code may be stored in the memory and executed by the processor to perform the functions of the electronic device 580. The electronic device 580 may be associated with the user 504, meaning that the user 504 uses the electronic device 580 to communicate with other devices, such as the communication device 510 as described below.

The electronic device 580 stores an application 582. The application 582 may be a software, a web, or a mobile application. The user 504 can login to the application 582 using their username and password. The user 504 can send the signal 526 to the communication device 510 from the user interfaces within the application 582.

Application Server

The application server 588 may be any computing device configured to communicate with other devices, such as other servers (e.g., oversight server 560), autonomous vehicles 702, databases, etc., via the network 508. The application server 588 is configured to perform functions described herein and interact with the remote operator 584, e.g., via communication path 590 using its user interfaces. Examples of the application server 588 include, but are not limited to, desktop computers, laptop computers, servers, etc. In one example, the application server 588 may act as a presentation layer from which the remote operator 584 accesses the oversight server 560. As such, the oversight server 560 may send the credentials 530 and/or any other data/instructions to the application server 588, e.g., via the network 508. The remote operator 584, after establishing the communication path 590 with the application server 588, may review the received data and confirm or deny access to the autonomous vehicle 702, as described below.

The remote operator 584 may be an individual who is associated with and has access to the oversight server 560. For example, the remote operator 584 may be an administrator that can access and view the information regarding the autonomous vehicle 702, such as credentials 530, autonomous vehicle metadata 548, and other information that is available on the memory 568. In one example, the remote operator 584 may access the oversight server 560 from an application server 588 that is acting as a presentation layer via the network.

Operational Flow for Granting Access to an Autonomous Vehicle

Receiving a Request to Pull Over the Autonomous Vehicle

The operational flow of the system 500 may begin when the control device 750 detects a request for the autonomous vehicle 702 to come to a safe stop, such as pull over to a side of a road when it is safe. In an example scenario, assume that the autonomous vehicle 702 is traveling along the road 502, and the user 504 (e.g., a law enforcement officer in the vehicle 506) initiates a request to access the autonomous vehicle 702. For example, the user 504 may request to access the autonomous vehicle 702 for a routine system checkup, retrieve data associated with the autonomous vehicle 702, such as the cargo carried by the autonomous vehicle 702, health data of one or more components of the autonomous vehicle 702, the routing plan of autonomous vehicle 702, and/or any other data.

To this end, the user 504 may flag the autonomous vehicle 702 to pull over. For example, the user 504 may flag the autonomous vehicle 702 to pull over by turning on the sirens of the vehicle 506, flashing lights of the vehicle 506, and/or using a speaker to request the autonomous vehicle 702 to pull over.

In response, the sensors 746 associated with the autonomous vehicle 702 capture sensor data 538 that indicate these flagging indications. For example, the sensors 746 detect an sound 540 emitted from the sirens of the vehicle 506, a speech command 542 of the user 504 that indicates to pull over the autonomous vehicle 702 and emitted by a loudspeaker device of the vehicle 506, and/or flashing lights produced by warning light source on vehicle 506. The sensors 746 send the sensor data 538 to the control device 750. The control device 750 analyzes the sensor data 538 using the object detection machine learning modules 162 and may determine that the sensor data 538 indicate that the user 504 requests the autonomous vehicle 702 to pull over.

In one embodiment, the user 504 may use the electronic device 580 to send a signal 526 to the communication device 510, where the signal 526 indicates to pull over the autonomous vehicle 702. The user 504 may use the application 582 to send the signal 526 to the communication device 510. The communication device 510 receives the signal 526 and forwards the signal 526 to the control device 750.

Based on analyzing the sensor data 538 and/or the signal 526, the control device 750 pulls over the autonomous vehicle 702 to a side of the road 502. In other words, the control device 750 causes the autonomous vehicle 702 to perform a safe stop maneuver 594. In this process, the control device 750 may look for a spot on a side of the road 502 that is obstacle-free by analyzing additional sensor data received from the sensors 746 using the object detection machine learning module 162.

Receiving and Validating Credential(s) of a User Who Initiated the Pullover Request After the control device 750 pulls over the autonomous vehicle 702, the user 504 can approach the autonomous vehicle 702 and present their credential 530. The credential 530 of the user 504 may include an identification card 532, a quick response (QR) code 534, a biometric feature 536 associated with the user 504.

In an embodiment where the communication device 510 is located in a compartment 556 external to the cab of the autonomous vehicle 702 and the communication device 510 is accessible from outside of the autonomous vehicle 702, the user 504 may present their credential 530 to the communication device 510 without granting the user 504 entry to the cab of the autonomous vehicle 702 by unlocking the door of the cab.

Receiving and Validating the Identification Card

With respect to receiving and validating the identification card 532, the user 504 may present their identification card 532 to the camera 520 associated with the communication device 510. The camera 520 captures an image of the identification card 532 and forwards it to the control device 750.

In one embodiment, validating the identification card 532 may be performed by the control device 750. In this embodiment, the control device 750 may store images of identification cards 532 associated with authorized users and/or keep records of information associated with users who are previously gone through an authentication process to be granted access to the autonomous vehicle 702. The control device 750 may store this information in the user profiles 546.

The user profiles 546 may include images of identification cards 532, names, ID numbers, records of biometric features of the authorized users who have previously gone through the authentication process to be granted access to the autonomous vehicle 702, and/or other data that can be used to identify the authorized users.

Thus, upon receiving a first image of the identification card 532 from the communication device 510, the control device 750 may implement an image processing algorithm to extract features from the first image of the identification card 532, such as the name of the user 504, ID number of the user 504, etc.

The control device 750 may search the user profile 546 to find a record that corresponds to (or matches) the data extracted from the first image of the identification card 532. If the control device 750 does not find an image of the identification card 532 that corresponds to (or matches) the captured image of the identification card 532, the control device 750 may determine that the user 504 is not authorized to access the autonomous vehicle 702.

For example, assume that the control device 750 finds a second image of the identification card 532 in the user profile 546. The control device 750 compares the second image of identification card 532 with the first image of the identification card 532. If the control device 750 determines that the second image of the identification card 532 corresponds to (or matches) the first image of the identification card 532, the control device validates the identification card 532 and may determine that the user 504 is authorized to access the autonomous vehicle 702.

In one embodiment, the control device 750 may determine that the second image of the identification card 532 corresponds to the first image of the identification card 532 by performing a vector comparison between a first set of features of the first image of the identification card 532 and a second set of features of the second image of the identification card 532, where the first and second sets of features are represented by numerical values.

In this process, the control device 750 may determine a Euclidian distance between a first vector that represents the features associated with the first image of the identification card 532 and a second vector that represents the features associated with the second image of the identification card 532. The Euclidian distance represents a similarity between the first image of the identification card 532 and the second image of the identification card 532. If the control device 750 determines that the Euclidian distance is less than a threshold percentage, e.g., 5%, 4%, etc., the control device 750 may determine that the first image of the identification card 532 corresponds to (or matches) the second image of the identification card 532. In response, the control device 750 validates the identification card 532 and may determine that the user 504 is authorized to access the autonomous vehicle 702.

In another example, assume that the control device 750 finds recorded data associated with the user 504 in the user profile 546, such as the name of the user 504, ID number, etc. The control device 750 may compare the recorded data with the features extracted from the first image of the identification card 532, such as the name of the user, ID number, etc. If the control device 750 determines that the recorded data corresponds to (or matches) the features extracted from the identification card 532, the control device 750 validates the identification card 532 and may determine that the user 504 is authorized to access the autonomous vehicle 702. Otherwise, the control device 750 may determine that the user 504 is not authorized to access the autonomous vehicle 702.

Verifying the Identification Card by a Remote Operator and/or an Oversight Server In one embodiment, validating the identification card 532 may be performed by the remote operator 584 and/or the oversight server 560. In this embodiment, upon receiving an image of the identification card 532, the control device 750 may send the image of the identification card 532 to the oversight server 560.

In one embodiment, the remote operator 584 may access and review the image of the identification card 532 using the user interfaces 566 of the oversight server 560. In another embodiment, the remote operator 584 may access and review the image of the identification card 532 (stored in the memory 568) via the application server 588.

The remote operator 584 may determine whether the identification card 532 is valid and associated with an authorized user by searching a database that stores data associated with the authorized users who have gone through a registration and authentication process, such as credentials 530.

If the remote operator 584 finds a record that matches the information on the identification card 532, the remote operator 584 may send a message 572 that indicates the user 504 is authorized to access the autonomous vehicle 702 to the control device 750. Otherwise, the remote operator 584 may send a message 572 that indicates the user 504 is not authorized to access the autonomous vehicle 702 to the control device 750.

Receiving and Validating the OR Code

With respect to receiving and validating the QR code 534, in response to receiving the signal 526 from the electronic device 580, the control device 750 may generate a QR code 534, store a first image of the QR code 534 in the memory 126, and send the QR code 534 to the electronic device 580.

The user 504 can present the QR code 534 to the camera 520. The camera 520 captures a second image of the QR code 534 and forwards it to the control device 750.

To verify the QR code 534, the control device 750 compares the second image of the QR code 534 with the first image of the QR code 534 that was previously stored in the memory 126, similar to that described above with respect to verifying the identification card 532.

If the control device 750 determines that the first image of the QR code 534 corresponds to (or matches) the second image of the QR code 534, the control device 750 may determine that the QR code 534 is valid and that the user 504 is authorized to access the autonomous vehicle 702. Otherwise, the control device 750 may determine that the QR code 534 is not valid and that the user 504 is not authorized to access the autonomous vehicle 702.

In one embodiment, validating the QR code 534 may be performed by the remote operator 584 and/or the oversight server 560, similar to that described above with respect to validating the identification card 532.

Receiving and Validating the Biometric Feature(s) of the User

With respect to receiving and validating the biometric features 536 of the user 504, the user 504 can present one or more of their biometric features 536, such as a fingerprint, a retinal, voice, predetermined passphrase, etc. to the one or more biometric feature scanners 516 associated with the communication device 510, such as a fingerprint scanner, a retinal scanner, voice recognition module, etc. The biometric feature scanner 516 scans the biometric feature 536 and forwards it to the control device 750.

The control device 750 may search the user profile 546 to find a scan (e.g., an image or a sample) of a biometric feature 536 that corresponds to (or matches) the first scan (e.g., image or sample) of the biometric feature 536.

To verify the biometric feature 536, the control device 750 compares a first scan (e.g., image or sample) of the biometric feature 536 with scans (e.g., images or samples) of biometric features associated with the authorized users previously stored in the user profiles 546.

The control device 750 compares the scans of the biometric feature 536 by implementing a machine learning algorithm, similar to that described above with respect to the identification card 532, a biometric feature processing algorithm, and/or any other suitable algorithm. For example, assume that the control device 750 finds a second image of the biometric feature 536 that corresponds to (or matches) the first image of the biometric feature 536. In this case, the control device 750 may determine that the user 504 is authorized to access the autonomous vehicle 702.

If the control device 750 does not find a scan of a biometric feature 536 that corresponds to (or matches) the captured scan of the biometric feature, the control device 750 may determine that the user 504 is not authorized to access the autonomous vehicle 702.

In one embodiment, validating the biometric feature 536 may be performed by the remote operator 584 and/or the oversight server 560, similar to that described above with respect to validating the identification card 532.

Granting Access to the Autonomous Vehicle

In response to verifying the credential 530 associated with the user 504, the control device 750 may grant the user 504 access to the autonomous vehicle 702 in various ways as described below.

In one embodiment, granting access to the autonomous vehicle 702 may comprise allowing the user 504 to access autonomous vehicle metadata 548 from the communication device 510. In one example, the control device 750 may display the autonomous vehicle metadata 548 on a display screen of the communication device 510. In another example, the control device 750 may allow the user 504 to download the autonomous vehicle metadata 548 from the communication device 510, for example, to the electronic device 580.

The autonomous vehicle metadata 548 may include logistics data 550, health data 552, routing plan 166, historical driving data 554, and/or any other data associated with the autonomous vehicle 702. The logistics data 550 may indicate the cargo carried by the autonomous vehicle 702. The health data 552 may include system health and functional status associated with the vehicle subsystems 640 of the autonomous vehicle 702 (see FIG. 7). For example, the health data 552 may include the health status of vehicle drive subsystem 742 (e.g., such as tire pressures, the temperature of the engine/motor 742a, etc.), vehicle sensor subsystems 744, vehicle control subsystems 748, and network communication subsystem 792. The routing plan 166 may include the route that the autonomous vehicle 702 is traveling to reach its destination. The historical driving data 554 may include the historical speed of the autonomous vehicle 702, historical routes driven by the autonomous vehicle 702, etc.

In one embodiment, granting access to the autonomous vehicle 702 may comprise establishing a network communication path 592 between the oversight server 560 and the control device 750. The oversight server 560 and/or the control device 750 may establish the network communication path 592.

In one embodiment, the network communication path 592 may follow a two-way communication protocol, where data can be transmitted and received from both sides. The network communication path 592 may be configured to support voice-based communication, message-based communication, and/or any other appropriate communication. Using voice-based communication, the user 504 and the remote operator 584 can converse with one another. Using message-based communication, each of the user 504 and the remote operator 584 can send and receive messages, such as text, images, videos, or any other type of data. Thus, the user 504 may communicate with the remote operator 584 using one or more user interfaces 518 associated with the communication device 510, such as a speaker, a microphone, and a display screen.

In one embodiment, granting access to the autonomous vehicle 702 may comprise granting the user 504 entry to the cab of the autonomous vehicle 702 by unlocking the door of the cab of the autonomous vehicle 702. In this embodiment, the control device 750, the oversight server 650, and/or the remote operator 584 may remotely unlock the door of the cab of the autonomous vehicle 702.

The user 504 may enter the cab of the autonomous vehicle 702 and access one or more components of the autonomous vehicle 702 to, for example, retrieve autonomous vehicle metadata 548, and/or establish the network communication path 592 with the oversight server 560.

In an embodiment where the communication device 510 is located inside of the cab of the autonomous vehicle 702, granting access to the autonomous vehicle 702 may include making the communication device 510 accessible from outside of the autonomous vehicle 702, to, for example, retrieve autonomous vehicle metadata 548, and/or establish the network communication path 592 with the oversight server 560.

In certain embodiments, a system may include any combination of components of the systems 100, 300, and 500, and be configured to perform one or more operations of the systems 100, 300, and 500 described in FIGS. 1-6.

Example Method for Granting Access to an Autonomous Vehicle

FIG. 6 illustrates an example flowchart of a method 600 for granting access to an autonomous vehicle 702. Modifications, additions, or omissions may be made to method 600. Method 600 may include more, fewer, or other operations. For example, operations may be performed in parallel or in any suitable order. While at times discussed as the autonomous vehicle 702, control device 750, communication device 510, oversight server 560, or components of any of thereof performing operations, any suitable system or components of the system may perform one or more operations of the method 600. For example, one or more operations of method 600 may be implemented, at least in part, in the form of software instructions 524, 528, 570, and processing instructions 780, respectively, from FIGS. 5 and 7, stored on non-transitory, tangible, machine-readable media (e.g., memories 522, 126, 568, and data storage 790, respectively, from FIGS. 5 and 7) that when run by one or more processors (e.g., processors 512, 122, 562, and 770, respectively, from FIGS. 5 and 7) may cause the one or more processors to perform operations 602-612.

Method 600 begins at operation 602 where the communication device 510 receives a signal 526 from the electronic device 580 associated with the user 504 that indicates the user 504 requests the autonomous vehicle 702 to pull over. For example, the user 504 may use the application 582 to send the signal 526 to the communication device 510. The communication device 510 forwards the signal 526 to the control device 750. In one embodiment, the control device 750 (via the sensors 746) may detect that the user 504 is signaling the autonomous vehicle 702 to pull over, e.g., using sirens, speaker, and/or flashing lights, similar to that described in FIG. 5.

At 604, the control device 750 pulls over the autonomous vehicle 702 to a side of the road 502. In this process, the control device 750 may receive sensor data from the sensors 746 and search for an obstacle-free spot on a side of the road 502.

At 606, the communication device 510 receives a credential 530 associated with the user 504. In this process, the user 504 may present one or more credentials 530 to the communication device 510, similar to that described in FIG. 5. The communication device 510 forwards the credential 530 to the control device 750 for evaluation.

At 608, the control device 750 may determine whether the credential 530 is verified. Various examples of determining whether the received credential 530 is valid are described in FIG. 5. For example, the control device 750 may search the user profiles 546 to find a record that corresponds to (or matches) the received credential 530, similar to that described in FIG. 5. If the control device 750 determines that the credential 530 is valid, method 600 proceeds to operation 612. Otherwise, method 600 proceeds to operation 610.

At 610, the control device 750 does not grant the user 504 access to the autonomous vehicle 702.

At 612, the control device 750 may grant the user 504 access to the autonomous vehicle 702. For example, the control device 750 may allow the user 504 to access, view, and/or download autonomous vehicle metadata 548 from the communication device 510. In another example, the control device 750 may establish the communication path 592 between the oversight server 560 and the control device 750 (and/or the communication device 510), such that the user 504 and the remote operator 584 can converse with each other. Other examples of granting access to the autonomous vehicle 702 are described in FIG. 5.

Example Autonomous Vehicle and its Operation

FIG. 7 shows a block diagram of an example vehicle ecosystem 700 in which autonomous driving operations can be determined. As shown in FIG. 7, the autonomous vehicle 702 may be a semi-trailer truck. The vehicle ecosystem 700 may include several systems and components that can generate and/or deliver one or more sources of information/data and related services to the in-vehicle control computer 750 that may be located in an autonomous vehicle 702. The in-vehicle control computer 750 can be in data communication with a plurality of vehicle subsystems 740, all of which can be resident in the autonomous vehicle 702. A vehicle subsystem interface 760 may be provided to facilitate data communication between the in-vehicle control computer 750 and the plurality of vehicle subsystems 740. In some embodiments, the vehicle subsystem interface 760 can include a controller area network (CAN) controller to communicate with devices in the vehicle subsystems 740.

The autonomous vehicle 702 may include various vehicle subsystems that support the operation of autonomous vehicle 702. The vehicle subsystems 740 may include a vehicle drive subsystem 742, a vehicle sensor subsystem 744, a vehicle control subsystem 748, and/or network communication subsystem 792. The components or devices of the vehicle drive subsystem 742, the vehicle sensor subsystem 744, and the vehicle control subsystem 748 shown in FIG. 7 are examples. The autonomous vehicle 702 may be configured as shown or any other configurations.

The vehicle drive subsystem 742 may include components operable to provide powered motion for the autonomous vehicle 702. In an example embodiment, the vehicle drive subsystem 742 may include an engine/motor 742a, wheels/tires 742b, a transmission 742c, an electrical subsystem 742d, and a power source 742e.

The vehicle sensor subsystem 744 may include a number of sensors 746 configured to sense information about an environment or condition of the autonomous vehicle 702. The vehicle sensor subsystem 744 may include one or more cameras 746a or image capture devices, a radar unit 746b, one or more temperature sensors 746c, a wireless communication unit 746d (e.g., a cellular communication transceiver), an inertial measurement unit (IMU) 746e, a laser range finder/LiDAR unit 746f, a Global Positioning System (GPS) transceiver 746g, and/or a wiper control system 746h. The vehicle sensor subsystem 744 may also include sensors configured to monitor internal systems of the autonomous vehicle 702 (e.g., an $O_2$ monitor, a fuel gauge, an engine oil temperature, etc.).

The IMU 746e may include any combination of sensors (e.g., accelerometers and gyroscopes) configured to sense position and orientation changes of the autonomous vehicle 702 based on inertial acceleration. The GPS transceiver 746g may be any sensor configured to estimate a geographic location of the autonomous vehicle 702. For this purpose, the GPS transceiver 746g may include a receiver/transmitter operable to provide information regarding the position of the autonomous vehicle 702 with respect to the Earth. The radar unit 746b may represent a system that utilizes radio signals to sense objects within the local environment of the autonomous vehicle 702. In some embodiments, in addition to sensing the objects, the radar unit 746b may additionally be configured to sense the speed and the heading of the objects proximate to the autonomous vehicle 702. The laser range finder or LiDAR unit 746f may be any sensor configured to use lasers to sense objects in the environment in which the autonomous vehicle 702 is located. The cameras 746a may include one or more devices configured to capture a plurality of images of the environment of the autonomous vehicle 702. The cameras 746a may be still image cameras or motion video cameras.

The vehicle control subsystem 748 may be configured to control the operation of the autonomous vehicle 702 and its components. Accordingly, the vehicle control subsystem 748 may include various elements such as a throttle and gear selector 748a, a brake unit 748b, a navigation unit 748c, a steering system 748d, and/or an autonomous control unit 748e. The throttle and gear selector 748a may be configured to control, for instance, the operating speed of the engine and, in turn, control the speed of the autonomous vehicle 702. The throttle and gear selector 748a may be configured to control the gear selection of the transmission. The brake unit 748b can include any combination of mechanisms configured to decelerate the autonomous vehicle 702. The brake unit 748b can slow the autonomous vehicle 702 in a standard manner, including by using friction to slow the wheels or engine braking. The brake unit 748b may include an anti-lock brake system (ABS) that can prevent the brakes from locking up when the brakes are applied. The navigation unit 748c may be any system configured to determine a driving path or route for the autonomous vehicle 702. The navigation unit 748c may additionally be configured to update the driving path dynamically while the autonomous vehicle 702 is in operation. In some embodiments, the navigation unit 748c may be configured to incorporate data from the GPS transceiver 746g and one or more predetermined maps so as to determine the driving path for the autonomous vehicle 702. The steering system 748d may represent any combination of mechanisms that may be operable to adjust the heading of autonomous vehicle 702 in an autonomous mode or in a driver-controlled mode.

The autonomous control unit 748e may represent a control system configured to identify, evaluate, and avoid or otherwise negotiate potential obstacles or obstructions in the environment of the autonomous vehicle 702. In general, the autonomous control unit 748e may be configured to control the autonomous vehicle 702 for operation without a driver or to provide driver assistance in controlling the autonomous vehicle 702. In some embodiments, the autonomous control unit 748e may be configured to incorporate data from the GPS transceiver 746g, the radar unit 746b, the LiDAR unit 746f, the cameras 746a, and/or other vehicle subsystems to determine the driving path or trajectory for the autonomous vehicle 702.

The network communication subsystem 792 may comprise network interfaces, such as routers, switches, modems, and/or the like. The network communication subsystem 792 may be configured to establish communication between the autonomous vehicle 702 and other systems including the oversight server 560 of FIG. 5. The network communication subsystem 792 may be further configured to send and receive data from and to other systems.

Many or all of the functions of the autonomous vehicle 702 can be controlled by the in-vehicle control computer 750. The in-vehicle control computer 750 may include at least one data processor 770 (which can include at least one microprocessor) that executes processing instructions 780 stored in a non-transitory computer-readable medium, such as the data storage device 790 or memory. The in-vehicle control computer 750 may also represent a plurality of computing devices that may serve to control individual components or subsystems of the autonomous vehicle 702 in a distributed fashion. In some embodiments, the data storage device 790 may contain processing instructions 780 (e.g., program logic) executable by the data processor 770 to perform various methods and/or functions of the autonomous vehicle 702, including those described with respect to FIGS. 1-9.

The data storage device 790 may contain additional instructions as well, including instructions to transmit data to, receive data from, interact with, or control one or more of the vehicle drive subsystem 742, the vehicle sensor subsystem 744, and the vehicle control subsystem 748. The in-vehicle control computer 750 can be configured to include a data processor 770 and a data storage device 790. The in-vehicle control computer 750 may control the function of the autonomous vehicle 702 based on inputs received from various vehicle subsystems (e.g., the vehicle drive subsystem 742, the vehicle sensor subsystem 744, and the vehicle control subsystem 748).

FIG. 8 shows an exemplary system 800 for providing precise autonomous driving operations. The system 800 may include several modules that can operate in the in-vehicle control computer 750, as described in FIG. 7. The in-vehicle control computer 750 may include a sensor fusion module 802 shown in the top left corner of FIG. 8, where the sensor fusion module 802 may perform at least four image or signal processing operations. The sensor fusion module 802 can obtain images from cameras located on an autonomous vehicle to perform image segmentation 804 to detect the presence of moving objects (e.g., other vehicles, pedestrians, etc.,) and/or static obstacles (e.g., stop sign, speed bump, terrain, etc.,) located around the autonomous vehicle. The sensor fusion module 802 can obtain LiDAR point cloud data item from LiDAR sensors located on the autonomous vehicle to perform LiDAR segmentation 706 to detect the presence of objects and/or obstacles located around the autonomous vehicle.

The sensor fusion module 802 can perform instance segmentation 708 on image and/or point cloud data items to identify an outline (e.g., boxes) around the objects and/or obstacles located around the autonomous vehicle. The sensor fusion module 802 can perform temporal fusion 810 where objects and/or obstacles from one image and/or one frame of point cloud data item are correlated with or associated with objects and/or obstacles from one or more images or frames subsequently received in time.

The sensor fusion module 802 can fuse the objects and/or obstacles from the images obtained from the camera and/or point cloud data item obtained from the LiDAR sensors. For example, the sensor fusion module 802 may determine based on a location of two cameras that an image from one of the cameras comprising one half of a vehicle located in front of the autonomous vehicle is the same as the vehicle captured by another camera. The sensor fusion module 802 may send the fused object information to the interference module 846 and the fused obstacle information to the occupancy grid module 860. The in-vehicle control computer may include the occupancy grid module 860 which can retrieve landmarks from a map database 858 stored in the in-vehicle control computer. The occupancy grid module 860 can determine drivable areas and/or obstacles from the fused obstacles obtained from the sensor fusion module 802 and the landmarks stored in the map database 858. For example, the occupancy grid module 860 can determine that a drivable area may include a speed bump obstacle.

Below the sensor fusion module 802, the in-vehicle control computer 750 may include a LiDAR-based object detection module 812 that can perform object detection 816 based on point cloud data item obtained from the LiDAR sensors 814 located on the autonomous vehicle. The object detection 816 technique can provide a location (e.g., in 3D world coordinates) of objects from the point cloud data item. Below the LiDAR-based object detection module 812, the in-vehicle control computer may include an image-based object detection module 818 that can perform object detection 824 based on images obtained from cameras 820 located on the autonomous vehicle. The object detection 818 technique can employ a deep machine learning technique 824 to provide a location (e.g., in 3D world coordinates) of objects from the image provided by the camera 820.

The radar 856 on the autonomous vehicle can scan an area in front of the autonomous vehicle or an area towards which the autonomous vehicle is driven. The radar data may be sent to the sensor fusion module 802 that can use the radar data to correlate the objects and/or obstacles detected by the radar 856 with the objects and/or obstacles detected from both the LiDAR point cloud data item and the camera image. The radar data also may be sent to the interference module 846 that can perform data processing on the radar data to track objects by object tracking module 848 as further described below.

The in-vehicle control computer may include an interference module 846 that receives the locations of the objects from the point cloud and the objects from the image, and the fused objects from the sensor fusion module 802. The interference module 846 also receives the radar data with which the interference module 846 can track objects by object tracking module 848 from one point cloud data item and one image obtained at one time instance to another (or the next) point cloud data item and another image obtained at another subsequent time instance.

The interference module 846 may perform object attribute estimation 850 to estimate one or more attributes of an object detected in an image or point cloud data item. The one or more attributes of the object may include a type of object (e.g., pedestrian, car, or truck, etc.). The interference module 846 may perform behavior prediction 852 to estimate or predict motion pattern of an object detected in an image and/or a point cloud. The behavior prediction 852 can be performed to detect a location of an object in a set of images received at different points in time (e.g., sequential images) or in a set of point cloud data item received at different points in time (e.g., sequential point cloud data items). In some embodiments, the behavior prediction 852 can be performed for each image received from a camera and/or each point cloud data item received from the LiDAR sensor. In some embodiments, the interference module 846 can be performed (e.g., run or executed) to reduce computational load by performing behavior prediction 852 on every other or after every pre-determined number of images received from a camera or point cloud data item received from the LiDAR sensor (e.g., after every two images or after every three point cloud data items).

The behavior prediction 852 feature may determine the speed and direction of the objects that surround the autonomous vehicle from the radar data, where the speed and direction information can be used to predict or determine motion patterns of objects. A motion pattern may comprise a predicted trajectory information of an object over a pre-determined length of time in the future after an image is received from a camera. Based on the motion pattern predicted, the interference module 846 may assign motion pattern situational tags to the objects (e.g., "located at coordinates (x,y)," "stopped," "driving at 50 mph," "speeding up" or "slowing down"). The situation tags can describe the motion pattern of the object. The interference module 846 may send the one or more object attributes (e.g., types of the objects) and motion pattern situational tags to the planning module 862. The interference module 846 may perform an environment analysis 854 using any information acquired by system 800 and any number and combination of its components.

The in-vehicle control computer may include the planning module 862 that receives the object attributes and motion pattern situational tags from the interference module 846, the drivable area and/or obstacles, and the vehicle location and pose information from the fused localization module 826 (further described below).

The planning module 862 can perform navigation planning 864 to determine a set of trajectories on which the autonomous vehicle can be driven. The set of trajectories can be determined based on the drivable area information, the one or more object attributes of objects, the motion pattern situational tags of the objects, location of the obstacles, and the drivable area information. In some embodiments, the navigation planning 864 may include determining an area next to the road where the autonomous vehicle can be safely parked in case of emergencies. The planning module 862 may include behavioral decision making 866 to determine driving actions (e.g., steering, braking, throttle) in response to determining changing conditions on the road (e.g., traffic light turned yellow, or the autonomous vehicle is in an unsafe driving condition because another vehicle drove in front of the autonomous vehicle and in a region within a pre-determined safe distance of the location of the autonomous vehicle). The planning module 862 performs trajectory generation 868 and selects a trajectory from the set of trajectories determined by the navigation planning operation 864. The selected trajectory information may be sent by the planning module 862 to the control module 870.

The in-vehicle control computer may include a control module 870 that receives the proposed trajectory from the planning module 862 and the autonomous vehicle location and pose from the fused localization module 826. The control module 870 may include a system identifier 872. The control module 870 can perform a model-based trajectory refinement 874 to refine the proposed trajectory. For example, the control module 870 can apply filtering (e.g., Kalman filter) to make the proposed trajectory data smooth and/or to minimize noise. The control module 870 may perform the robust control 776 by determining, based on the refined proposed trajectory information and current location and/or pose of the autonomous vehicle, an amount of brake pressure to apply, a steering angle, a throttle amount to control the speed of the vehicle, and/or a transmission gear. The control module 870 can send the determined brake pressure, steering angle, throttle amount, and/or transmission gear to one or more devices in the autonomous vehicle to control and facilitate precise driving operations of the autonomous vehicle.

The deep image-based object detection 824 performed by the image-based object detection module 818 can also be used detect landmarks (e.g., stop signs, speed bumps, etc.,) on the road. The in-vehicle control computer may include a fused localization module 826 that obtains landmarks detected from images, the landmarks obtained from a map database 836 stored on the in-vehicle control computer, the landmarks detected from the point cloud data item by the LiDAR-based object detection module 812, the speed and displacement from the odometer sensor 844 and the estimated location of the autonomous vehicle from the GPS/IMU sensor 838 (i.e., GPS sensor 840 and IMU sensor 842) located on or in the autonomous vehicle. Based on this information, the fused localization module 826 can perform a localization operation 828 to determine a location of the autonomous vehicle, which can be sent to the planning module 862 and the control module 870.

The fused localization module 826 can estimate pose 830 of the autonomous vehicle based on the GPS and/or IMU sensors 838. The pose of the autonomous vehicle can be sent to the planning module 862 and the control module 870. The fused localization module 826 can also estimate status (e.g., location, possible angle of movement) of the trailer unit based on (e.g., trailer status estimation 834), for example, the information provided by the IMU sensor 842 (e.g., angular rate and/or linear velocity). The fused localization module 826 may also check the map content 832.

Figure 9:
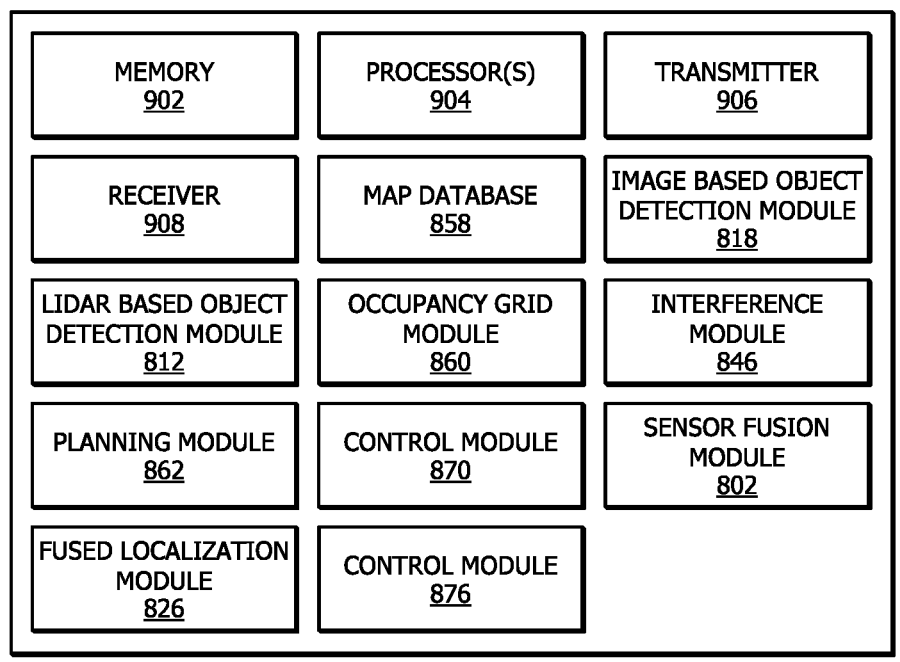
FIG. 9 illustrates a block diagram of an in-vehicle control computer included in the autonomous vehicle of FIG. 7.

FIG. 9 shows an exemplary block diagram of an in-vehicle control computer 750 included in an autonomous vehicle 702. The in-vehicle control computer 750 may include at least one processor 904 and a memory 902 having instructions stored thereupon (e.g., software instructions 128, 320, 528, and processing instructions 780 in FIGS. 1, 3, 5, and 7, respectively). The instructions, upon execution by the processor 904, configure the in-vehicle control computer 750 and/or the various modules of the in-vehicle control computer 750 to perform the operations described in FIGS. 1-9. The transmitter 906 may transmit or send information or data to one or more devices in the autonomous vehicle. For example, the transmitter 906 can send an instruction to one or more motors of the steering wheel to steer the autonomous vehicle. The receiver 908 receives information or data transmitted or sent by one or more devices. For example, the receiver 908 receives a status of the current speed from the odometer sensor or the current transmission gear from the transmission. The transmitter 906 and receiver 908 also may be configured to communicate with the plurality of vehicle subsystems 740 and the in-vehicle control computer 750 described above in FIGS. 7 and 8.

While several embodiments have been provided in this disclosure, it should be understood that the disclosed systems and methods might be embodied in many other specific forms without departing from the spirit or scope of this disclosure. The present examples are to be considered as illustrative and not restrictive, and the intention is not to be limited to the details given herein. For example, the various elements or components may be combined or integrated into another system or certain features may be omitted, or not implemented.

In addition, techniques, systems, subsystems, and methods described and illustrated in the various embodiments as discrete or separate may be combined or integrated with other systems, modules, techniques, or methods without departing from the scope of this disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

Implementations of the disclosure can be described in view of the following clauses, the features of which can be combined in any reasonable manner.

Clause 1. A system, comprising:
 a control device associated with an autonomous vehicle and comprising:
  a communication device configured to receive, from a device associated with a user, a signal comprising a request for the autonomous vehicle to come to a safe stop; and
  at least one processor, operably coupled with the communication device, and configured to perform operations comprising:
   in response to receiving the signal, causing the autonomous vehicle to perform a safe stop maneuver;
   receiving a credential associated with the user;
   determining whether the credential associated with the user is verified; and
   in response to determining that the credential associated with the user is verified, granting the user access to the autonomous vehicle.

Clause 2. The system of Clause 1, wherein the operations further comprise, in response to determining that the credential associated with the user is not verified, denying the user access to the autonomous vehicle.

Clause 3. The system of Clause 1, wherein the communication device comprises a computing device, including a laptop, a mobile phone, or a tablet.

Clause 4. The system of Clause 1, wherein the communication device is located in a compartment external to a cab of the autonomous vehicle.

Clause 5. The system of Clause 1, wherein the communication device is located inside a cab of the autonomous vehicle.

Clause 6. The system of Clause 1, wherein granting access to the autonomous vehicle comprises making the communication device accessible from outside of the autonomous vehicle.

Clause 7. The system of Clause 1, wherein granting access to the autonomous vehicle comprises displaying data associated with the autonomous vehicle, and wherein the data associated with the autonomous vehicle comprises at least one of a cargo carried by the autonomous vehicle, health data associated with one or more components of the autonomous vehicle, and a routing plan of the autonomous vehicle.

Clause 8. A method, comprising:
receiving, by a control device, a signal comprising a request for an autonomous vehicle to come to a safe stop;
in response to receiving the signal, causing the autonomous vehicle to perform a safe stop maneuver;
receiving a credential associated with a user;
determining whether the credential associated with the user is verified; and
in response to determining that the credential associated with the user is verified, granting the user access to the autonomous vehicle.

Clause 9. The method of Clause 8, wherein granting the user access to the autonomous vehicle comprises unlocking a door of a cab of the autonomous vehicle.

Clause 10. The method of Clause 8, wherein granting the user access to the autonomous vehicle comprises providing audio and/or video communication between the user and a remote operator via a network communication path.

Clause 11. The method of Clause 8, wherein granting the user access to the autonomous vehicle comprises allowing downloading data associated with the autonomous vehicle, and
wherein the data associated with the autonomous vehicle comprises at least one of cargo carried by the autonomous vehicle, health data associated with one or more components of the autonomous vehicle, and a routing plan of the autonomous vehicle.

Clause 12. The method of Clause 8, wherein the credential associated with the user comprises an identification card, and wherein determining that the credential associated with the user is verified comprises:
capturing, by a camera coupled to the control device, a first image of the identification card;
comparing the first image of the identification card and a second image of the identification card previously stored in a memory associated with the control device; and
determining that the first image of the identification card matches the second image of the identification card.

Clause 13. The method of Clause 8, wherein the credential associated with the user comprises a quick response code, and wherein determining that the credential associated with the user is verified further comprises:
capturing a first image of the quick response code by a camera coupled to the control device;
comparing the first image of the quick response code with a second image of the quick response code stored in a memory associated with the control device; and
determining that the first image of the quick response code matches the second image of the quick response code.

Clause 14. The method of Clause 8, wherein the credential associated with the user comprises a biometric feature, and wherein determining that the credential associated with the user is verified further comprises:
capturing a first scan of the biometric feature by a biometric scanner coupled to the control device;
comparing the first scan of the biometric feature with a second scan of the biometric feature previously stored in a memory associated with the control device; and
determining that the first scan of the biometric feature matches the second scan of the biometric feature.

Clause 15. The method of Clause 14, wherein the biometric feature comprises at least one of a fingerprint and a retinal scan of features associated with the user, and
wherein the biometric scanner comprises at least one of a fingerprint scanner and a retinal scanner.

Clause 16. The method of Clause 8, further comprising:
receiving sensor data from a sensor located on the autonomous vehicle;
detecting, based on the sensor data, an indication that the autonomous vehicle should come to a safe stop; and
in response to the indication being detected, causing the autonomous vehicle to perform the safe stop maneuver.

Clause 17. The method of Clause 16, wherein the sensor comprises at least one of a microphone, a camera, a light detection and ranging sensor, an infrared sensor, and a radar.

Clause 18. The method of Clause 16, wherein detecting the indication that the autonomous vehicle should come to a safe stop comprises detecting one or more of a sound emitted by a siren device of another vehicle, a speech command emitted by a loudspeaker device of the other vehicle, and flashing lights produced by warning light source on the other vehicle.

Clause 19. The method of Clause 8, wherein the autonomous vehicle comprises a semi-truck tractor unit attached to a trailer.

Clause 20. A non-transitory computer-readable medium storing instructions that when executed by one or more processors, cause the one or more processors to perform operations comprising:
receiving, from a device associated with a user, a signal comprising a request for an autonomous vehicle to come to a safe stop;
in response to receiving the signal, causing the autonomous vehicle to perform a safe stop maneuver;
receiving a credential associated with the user;
determining whether the credential associated with the user is verified; and
in response to determining that the credential associated with the user is verified, granting the user access to the autonomous vehicle.

The invention claimed is:
1. A system, comprising:
a control device associated with an autonomous vehicle and comprising:
a communication device configured to receive, from a computing device associated with a user, a signal comprising a request for the autonomous vehicle to come to a safe stop, wherein the computing device is remote with respect to the autonomous vehicle; and at least one processor, operably coupled with the communication device, and configured to perform operations comprising:
in response to receiving the signal;
causing the autonomous vehicle to perform a safe stop maneuver;
receiving a credential associated with the user;
determining whether the credential associated with the user is verified; and
in response to determining that the credential associated with the user is verified, granting the user access to the autonomous vehicle;
wherein the control device is further configured to:
detect that a particular part of a road does not receive enough light based on a particular portion of an image received from sensors having a light condition level less than a threshold light level; and
adjust a headlight of the autonomous vehicle to illuminate the particular part of the road that is shown in the particular portion of the image.

2. The system of claim 1, wherein the operations further comprise, in response to determining that the credential associated with the user is not verified, denying the user access to the autonomous vehicle.

3. The system of claim 1, wherein the communication device comprises a computing device, including a laptop, a mobile phone, or a tablet.

4. The system of claim 1, wherein the communication device is located in a compartment external to a cab of the autonomous vehicle.

5. The system of claim 1, wherein the communication device is located inside a cab of the autonomous vehicle.

6. The system of claim 1, wherein granting access to the autonomous vehicle comprises making the communication device accessible from outside of the autonomous vehicle.

7. The system of claim 1, wherein granting access to the autonomous vehicle comprises displaying data associated with the autonomous vehicle, and
wherein the data associated with the autonomous vehicle comprises at least one of a cargo carried by the autonomous vehicle, health data associated with one or more components of the autonomous vehicle, and a routing plan of the autonomous vehicle.

8. A method, comprising:
receiving, by a control device, a signal comprising a request for an autonomous vehicle to come to a safe stop, wherein the signal is received from a computing device associated with a user, wherein the computing device is remote with respect to the autonomous vehicle;
in response to receiving the signal;
causing the autonomous vehicle to perform a safe stop maneuver; receiving a credential associated with the user;
determining whether the credential associated with the user is verified; and
in response to determining that the credential associated with the user is verified, granting the user access to the autonomous vehicle;
detecting that a particular part of a road does not receive enough light based on a particular portion of an image received from sensors having a light condition level less than a threshold light level; and
adjusting a headlight of the autonomous vehicle to illuminate the particular part of the road that is shown in the particular portion of the image.

9. The method of claim 8, wherein granting the user access to the autonomous vehicle comprises unlocking a door of a cab of the autonomous vehicle.

10. The method of claim 8, wherein granting the user access to the autonomous vehicle comprises providing audio and/or video communication between the user and a remote operator via a network communication path.

11. The method of claim 8, wherein granting the user access to the autonomous vehicle comprises allowing downloading data associated with the autonomous vehicle, and
wherein the data associated with the autonomous vehicle comprises at least one of cargo carried by the autonomous vehicle, health data associated with one or more components of the autonomous vehicle, and a routing plan of the autonomous vehicle.

12. The method of claim 8, wherein the credential associated with the user comprises an identification card, and wherein determining that the credential associated with the user is verified comprises:
capturing, by a camera coupled to the control device, a first image of the identification card;
comparing the first image of the identification card and a second image of the identification card previously stored in a memory associated with the control device; and determining that the first image of the identification card matches the second image of the identification card.

13. The method of claim 8, wherein the credential associated with the user comprises a quick response code, and wherein determining that the credential associated with the user is verified further comprises:
capturing a first image of the quick response code by a camera coupled to the control device;
comparing the first image of the quick response code with a second image of the quick response code stored in a memory associated with the control device; and
determining that the first image of the quick response code matches the second image of the quick response code.

14. The method of claim 8, wherein the credential associated with the user comprises a biometric feature, and wherein determining that the credential associated with the user is verified further comprises:
capturing a first scan of the biometric feature by a biometric scanner coupled to the control device;
comparing the first scan of the biometric feature with a second scan of the biometric feature previously stored in a memory associated with the control device; and
determining that the first scan of the biometric feature matches the second scan of the biometric feature.

15. The method of claim 14, wherein the biometric feature comprises at least one of a fingerprint and a retinal scan of features associated with the user, and
wherein the biometric scanner comprises at least one of a fingerprint scanner and a retinal scanner.

16. The method of claim 8, further comprising:
receiving sensor data from a sensor located on the autonomous vehicle;
detecting, based on the sensor data, an indication that the autonomous vehicle should come to a safe stop; and
in response to the indication being detected, causing the autonomous vehicle to perform the safe stop maneuver.

17. The method of claim 16, wherein the sensor comprises at least one of a microphone, a camera, a light detection and ranging sensor, an infrared sensor, and a radar.

18. The method of claim 16, wherein detecting the indication that the autonomous vehicle should come to a safe stop comprises detecting one or more of a sound emitted by a siren device of another vehicle, a speech command emitted by a loudspeaker device of the another vehicle, and flashing lights produced by warning light source on the another vehicle.

19. The method of claim 8, wherein the autonomous vehicle comprises a semi-truck tractor unit attached to a trailer.

20. A non-transitory computer-readable medium storing instructions that when executed by one or more processors, cause the one or more processors to:
- receive, from a computing device associated with a user, a signal comprising a request for an autonomous vehicle to come to a safe stop, wherein the computing device is remote with respect to the autonomous vehicle;
- in response to receiving the signal;
- cause the autonomous vehicle to perform a safe stop maneuver;
- receive a credential associated with the user;
- determine whether the credential associated with the user is verified; and
- in response to determining that the credential associated with the user is verified,
- grant the user access to the autonomous vehicle;
- detect that a particular part of a road does not receive enough light based on a particular portion of an image received from sensors having a light condition level less than a threshold light level; and
- adjust a headlight of the autonomous vehicle to illuminate the particular part of the road that is shown in the particular portion of the image.

* * * * *